US012616948B2

(12) United States Patent
Berthier et al.

(10) Patent No.: US 12,616,948 B2
(45) Date of Patent: *May 5, 2026

(54) POLYAMIDE MICROCAPSULES

(71) Applicant: FIRMENICH SA, Satigny (CH)

(72) Inventors: Damien Berthier, Satigny (CH);
Marlène Jacquemond, Satigny (CH);
Lahoussine Ouali, Satigny (CH); Amal Elabbadi, Satigny (CH); Anaick Nicolae, Satigny (CH)

(73) Assignee: FIRMENICH SA, Satigny (CH)

( * ) Notice: Subject to any disclaimer, the term of this patent is extended or adjusted under 35 U.S.C. 154(b) by 902 days.

This patent is subject to a terminal disclaimer.

(21) Appl. No.: 17/312,749

(22) PCT Filed: Dec. 19, 2019

(86) PCT No.: PCT/EP2019/086321
§ 371 (c)(1),
(2) Date: Jun. 10, 2021

(87) PCT Pub. No.: WO2020/127743
PCT Pub. Date: Jun. 25, 2020

(65) Prior Publication Data
US 2022/0250024 A1 Aug. 11, 2022
US 2024/0375074 A9 Nov. 14, 2024

(30) Foreign Application Priority Data

Dec. 19, 2018 (EP) ..................................... 18214089

(51) Int. Cl.
*B01J 13/16* (2006.01)
*C11D 3/50* (2006.01)
(52) U.S. Cl.
CPC .............. *B01J 13/16* (2013.01); *C11D 3/505* (2013.01)
(58) Field of Classification Search
CPC ...... B01J 13/16; C11D 3/505; C11D 2111/12; C11D 2111/14; C11D 3/30; C11D 3/33; A01N 25/28
See application file for complete search history.

(56) References Cited

U.S. PATENT DOCUMENTS

| | | | |
|---|---|---|---|
| 4,018,688 A | 4/1977 | Pracht et al. | |
| 4,307,169 A | 12/1981 | Matkan | |
| 6,500,447 B1 * | 12/2002 | Dexter ................... | A01N 33/18 |
| | | | 264/4.1 |
| 9,890,351 B2 | 2/2018 | Smets et al. | |
| 2013/0295149 A1 * | 11/2013 | Ouali ....................... | A61K 8/11 |
| | | | 424/401 |
| 2018/0116212 A1 | 5/2018 | Wang et al. | |

FOREIGN PATENT DOCUMENTS

| | | | | |
|---|---|---|---|---|
| EP | 2468239 A1 | 6/2012 | | |
| GB | 1142649 A | 2/1969 | | |
| JP | S62297325 A | 12/1987 | | |
| JP | H04219133 A | 8/1992 | | |
| JP | 2000272239 A | 10/2000 | | |
| JP | 2006199903 A | 8/2006 | | |
| JP | 2014524973 A | 9/2014 | | |
| WO | 2015014792 A1 | 2/2015 | | |
| WO | WO-2015197757 A1 * | 12/2015 | ............... | A61K 8/11 |

OTHER PUBLICATIONS

Machine English translation of EP 1640063; Caldero et al. (Year: 2004).*
Machine English translation of DE 10 201 028 826; Taden et al. (Year: 2010).*
International Search Report and Written Opinion for corresponding PCT/EP2019/086321 mailed Apr. 20, 2020, 29 Pages.

* cited by examiner

*Primary Examiner* — Jessica M Roswell
(74) *Attorney, Agent, or Firm* — Armstrong Teasdale LLP

(57) ABSTRACT

Described herein are a new process for the preparation of polyamide microcapsules, as well as such polyamide microcapsules. Further described are perfuming compositions and consumer products including such capsules, in particular perfumed consumer products in the form of home care or personal care products.

9 Claims, No Drawings

POLYAMIDE MICROCAPSULES

CROSS-REFERENCE TO RELATED APPLICATIONS

This application is a U.S. National Phase Application of International Patent Application No. PCT/EP2019/086321, filed Dec. 19, 2019, which claims the benefit of priority to European Patent Application No. 18214089.7, filed Dec. 19, 2018, the entire contents of each of which are hereby incorporated by reference herein.

TECHNICAL FIELD

The present invention relates to a new process for the preparation of polyamide microcapsules. Polyamide microcapsules are also an object of the invention. Perfuming compositions and consumer products comprising said microcapsules, in particular perfumed consumer products in the form of home care or personal care products, are also part of the invention.

BACKGROUND OF THE INVENTION

One of the problems faced by the perfumery industry lies in the relatively rapid loss of olfactive benefit provided by odoriferous compounds due to their volatility, particularly that of "top-notes". In order to tailor the release rates of volatiles, delivery systems such as microcapsules containing a perfume are needed to protect and later release the core payload when triggered. A key requirement from the industry regarding these systems is to survive suspension in challenging bases without physically dissociating or degrading. This is referred to as stability for the delivery system. For instance, fragranced personal and household cleansers containing high levels of aggressive surfactant detergents are very challenging for the stability of microcapsules.

Polyurea and polyurethane-based microcapsule slurry are widely used for example in perfumery industry for instance as they provide a long lasting pleasant olfactory effect after their applications on different substrates. Those microcapsules have been widely disclosed in the prior art (see for example WO2007/004166 or EP 2300146 from the Applicant).

There is still a need to provide new microcapsules, while not compromising on the performance of the microcapsules, in particular in terms of stability in a challenging medium such as a consumer product base, as well as in delivering a good performance in terms of active ingredient delivery, e.g. olfactive performance in the case of perfuming ingredients.

The present invention is proposing a solution to the above-mentioned problem by providing new polyamide microcapsules and a process for preparing said microcapsules.

SUMMARY OF THE INVENTION

It has now been surprisingly found that performing core-shell microcapsules encapsulating hydrophobic material could be obtained by reacting an acyl chloride with two amino compounds during the process, wherein the amino compounds are preferably added successively during the process. The process of the invention therefore provides a solution to the above-mentioned problems as it allows preparing microcapsules with the desired stability in challenging bases.

In a first aspect, the present invention relates to a process for preparing a polyamide core-shell microcapsule slurry comprising the following steps:

a) Dissolving at least one acyl chloride in a hydrophobic material, preferably a perfume to form an oil phase;

b) Dispersing the oil phase obtained in step a) into a water phase comprising a first amino-compound to form an oil-in water emulsion;

c) Performing a curing step to form polyamide microcapsules in the form of a slurry;

wherein a stabilizer is added in the oil phase and/or in the water phase, and wherein at least a second amino-compound is added in the water phase before the formation of the oil-in-water emulsion and/or in the oil-in water emulsion obtained after step b).

A second object of the invention is a polyamide core-shell microcapsule comprising:

an oil based core comprising a hydrophobic material, preferably a perfume, and a polyamide shell comprising:

an acyl chloride, a first amino compound, a second amino compound.

A third object of the invention is a polyamide core-shell microcapsule slurry obtainable by the process as defined above.

A perfuming composition comprising:

(i) microcapsule as defined above, wherein the hydrophobic material comprises a perfume, (ii) at least one ingredient selected from the group consisting of a perfumery carrier and a perfumery base (iii) optionally at least one perfumery adjuvant is another object of the invention.

Another object of the invention is a consumer product comprising:

a personal care active base, and microcapsules as defined above or the perfuming composition as defined above, wherein the consumer product is in the form of a personal care composition.

Another object of the invention is a consumer product comprising:

a home care or a fabric care active base, and microcapsules as defined above or the perfuming composition as defined above, wherein the consumer product is in the form of a home care or a fabric care composition.

DETAILED DESCRIPTION OF THE INVENTION

Unless stated otherwise, percentages (%) are meant to designate a percentage by weight of a composition.

By "active ingredient", it is meant a single compound or a combination of ingredients.

By "perfume or flavour oil", it is meant a single perfuming or flavouring compound or a mixture of several perfuming or flavouring compounds.

By "consumer product" or "end-product" it is meant a manufactured product ready to be distributed, sold and used by a consumer.

For the sake of clarity, by the expression "dispersion" in the present invention it is meant a system in which particles are dispersed in a continuous phase of a different composition and it specifically includes a suspension or an emulsion.

A "microcapsule", or the similar, in the present invention it is meant that core-shell microcapsules have a particle size distribution in the micron range (e.g. a mean diameter (d(v, 0.5)) comprised between about 1 and 3000 microns) and comprise an external solid polymer-based shell and an internal continuous oil phase enclosed by the external shell.

By "amino-compound" it should be understood a compound having at least two reactive amine groups.

In the present invention, the terms "acyl chloride" and "acid chloride" are used indifferently.

By "polyamide microcapsules", it means that the microcapsule's shell comprises a polyamide material. The wording "polyamide microcapsules" can also encompass a shell made of a composite comprising a polyamide material and another material, for example a biopolymer.

It has been found that core-shell polyamide microcapsules with overall good performance in challenging bases could be obtained when two amino compounds are added preferably successively during the process.

Process for Preparing a Polyamide Microcapsule Slurry

In a first aspect, the present invention relates to a process for preparing a polyamide core-shell microcapsule slurry comprising the following steps:

a) Dissolving at least one acyl chloride in a hydrophobic material, preferably a perfume to form an oil phase;

b) Dispersing the oil phase obtained in step a) into a water phase comprising a first amino-compound to form an oil-in water emulsion;

c) Performing a curing step to form polyamide microcapsules in the form of a slurry;

wherein a stabilizer is added in the oil phase and/or in the water phase, and wherein at least a second amino-compound is added in the water phase before the formation of the oil-in-water emulsion and/or in the oil-in water emulsion obtained after step b).

According to a particular embodiment, the process comprises the following steps:

a) Dissolving at least one acyl chloride in a hydrophobic material, preferably a perfume to form an oil phase;

b) Dispersing the oil phase obtained in step a) into a water phase comprising a first amino compound to form an oil-in water emulsion;

c) Adding to the oil-in-water emulsion obtained in step b) a second amino compound, and d) Performing a curing step to form polyamide microcapsules in the form of a slurry;

wherein a stabilizer is added in the oil phase and/or in the water phase.

In one step of the process, an oil phase is formed by admixing at least one hydrophobic material with at least one acyl chloride.

According to a particular embodiment, the acyl chloride is chosen in the group consisting of benzene-1,3,5-tricarbonyl chloride, benzene-1,2,4-tricarbonyl trichloride, benzene-1,2,4,5-tetracarbonyl tetrachloride, cyclohexane-1,3,5-tricarbonyl trichloride, isophthalyol dichloride, diglycolyl dichloride, succinic dichloride, and mixtures thereof.

The weight ratio between acyl chloride and the hydrophobic material is preferably comprised between 0.01 and 0.09, more preferably between 0.03 and 0.07.

The acyl chloride can be dissolved directly in the perfume oil or can be pre-dispersed in an inert solvent such as benzyl benzoate before mixing with the perfume oil.

According to a particular embodiment, a polyisocyanate having at least two isocyanate functional groups is added in the oil phase.

Suitable polyisocyanates used according to the invention include aromatic polyisocyanate, aliphatic polyisocyanate and mixtures thereof. Said polyisocyanate comprises at least 2, preferably at least 3 but may comprise up to 6, or even only 4, isocyanate functional groups. According to a particular embodiment, a triisocyanate (3 isocyanate functional group) is used.

According to one embodiment, said polyisocyanate is an aromatic polyisocyanate.

The term "aromatic polyisocyanate" is meant here as encompassing any polyisocyanate comprising an aromatic moiety. Preferably, it comprises a phenyl, a toluyl, a xylyl, a naphthyl or a diphenyl moiety, more preferably a toluyl or a xylyl moiety. Preferred aromatic polyisocyanates are biurets, polyisocyanurates and trimethylol propane adducts of diisocyanates, more preferably comprising one of the above-cited specific aromatic moieties. More preferably, the aromatic polyisocyanate is a polyisocyanurate of toluene diisocyanate (commercially available from Bayer under the tradename Desmodur® RC), a trimethylol propane-adduct of toluene diisocyanate (commercially available from Bayer under the tradename Desmodur® L75), a trimethylol propane-adduct of xylylene diisocyanate (commercially available from Mitsui Chemicals under the tradename Takenate® D-110N). In a most preferred embodiment, the aromatic polyisocyanate is a trimethylol propane-adduct of xylylene diisocyanate.

According to another embodiment, said polyisocyanate is an aliphatic polyisocyanate. The term "aliphatic polyisocyanate" is defined as a polyisocyanate which does not comprise any aromatic moiety. Preferred aliphatic polyisocyanates are a trimer of hexamethylene diisocyanate, a trimer of isophorone diisocyanate, a trimethylol propane-adduct of hexamethylene diisocyanate (available from Mitsui Chemicals) or a biuret of hexamethylene diisocyanate (commercially available from Bayer under the tradename Desmodur® N 100), among which a biuret of hexamethylene diisocyanate is even more preferred.

According to another embodiment, the at least one polyisocyanate is in the form of a mixture of at least one aliphatic polyisocyanate and of at least one aromatic polyisocyanate, both comprising at least two or three isocyanate functional groups, such as a mixture of a biuret of hexamethylene diisocyanate with a trimethylol propane-adduct of xylylene diisocyanate, a mixture of a biuret of hexamethylene diisocyanate with a polyisocyanurate of toluene diisocyanate and a mixture of a biuret of hexamethylene diisocyanate with a trimethylol propane-adduct of toluene diisocyanate. Most preferably, it is a mixture of a biuret of hexamethylene diisocyanate with a trimethylol propane-adduct of xylylene diisocyanate. Preferably, when used as a mixture the molar ratio between the aliphatic polyisocyanate and the aromatic polyisocyanate is ranging from 80:20 to 10:90.

According to an embodiment, the at least one polyisocyanate used in the process of the invention is present in amounts representing from 0.1 to 15%, preferably from 0.5 to 10% and more preferably from 0.8 to 6%, and even more preferably between 1 and 3% by weight based on the total amount of the oil phase.

Hydrophobic Material

According to an embodiment, the hydrophobic material is a hydrophobic active ingredient.

By "hydrophobic active ingredient", it is meant any hydrophobic active ingredient—single ingredient or a mixture of ingredients—which forms a two-phase dispersion when mixed with water. The hydrophobic active ingredient is liquid at about 20° C.

Hydrophobic active ingredients are preferably chosen from the group consisting of flavor, flavor ingredients, perfume, perfume ingredients, nutraceuticals, cosmetics, pest control agents, biocide actives and mixtures thereof.

According to a particular embodiment, the hydrophobic active ingredient comprises a mixture of a perfume with another ingredient selected from the group consisting of nutraceuticals, cosmetics, pest control agents and biocide actives.

According to a particular embodiment, the hydrophobic active ingredient comprises a mixture of biocide actives with another ingredient selected from the group consisting of perfume, nutraceuticals, cosmetics, pest control agents.

According to a particular embodiment, the hydrophobic active ingredient comprises a mixture of pest control agents with another ingredient selected from the group consisting of perfume, nutraceuticals, cosmetics, biocide actives.

According to a particular embodiment, the hydrophobic active ingredient comprises a perfume.

According to a particular embodiment, the hydrophobic active ingredient consists of a perfume.

According to a particular embodiment, the hydrophobic active ingredient consists of biocide actives.

According to a particular embodiment, the hydrophobic active ingredient consists of pest control agents.

By "perfume" (or also "perfume oil") what is meant here is an ingredient or composition that is a liquid at about 20° C. According to any one of the above embodiments said perfume oil can be a perfuming ingredient alone or a mixture of ingredients in the form of a perfuming composition. As a "perfuming ingredient" it is meant here a compound, which is used for the primary purpose of conferring or modulating an odour. In other words such an ingredient, to be considered as being a perfuming one, must be recognized by a person skilled in the art as being able to at least impart or modify in a positive or pleasant way the odor of a composition, and not just as having an odor. For the purpose of the present invention, perfume oil also includes combination of perfuming ingredients with substances which together improve, enhance or modify the delivery of the perfuming ingredients, such as perfume precursors, emulsions or dispersions, as well as combinations which impart an additional benefit beyond that of modifying or imparting an odor, such as long-lasting, blooming, malodour counteraction, antimicrobial effect, microbial stability, pest control.

The nature and type of the perfuming ingredients present in the oil phase do not warrant a more detailed description here, which in any case would not be exhaustive, the skilled person being able to select them on the basis of its general knowledge and according to intended use or application and the desired organoleptic effect. In general terms, these perfuming ingredients belong to chemical classes as varied as alcohols, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that said ingredients may also be compounds known to release in a controlled manner various types of perfuming compounds.

In particular one may cite perfuming ingredients which are commonly used in perfume formulations, such as:

Aldehydic ingredients: decanal, dodecanal, 2-methyl-undecanal, 10-undecenal, octanal, nonanal and/or nonenal;

Aromatic-herbal ingredients: eucalyptus oil, camphor, eucalyptol, 5-methyltricyclo[6.2.1.0~2,7~]undecan-4-one, 1-methoxy-3-hexanethiol, 2-ethyl-4,4-dimethyl-1,3-oxathiane, 2,2,7/8,9/10-Tetramethylspiro[5.5]undec-8-en-1-one, menthol and/or alpha-pinene;

Balsamic ingredients: coumarin, ethylvanillin and/or vanillin;

Citrus ingredients: dihydromyrcenol, citral, orange oil, linalyl acetate, citronellyl nitrile, orange terpenes, limonene, 1-p-menthen-8-yl acetate and/or 1,4(8)-p-menthadiene;

Floral ingredients: methyl dihydrojasmonate, linalool, citronellol, phenylethanol, 3-(4-tert-butylphenyl)-2-methylpropanal, hexylcinnamic aldehyde, benzyl acetate, benzyl salicylate, tetrahydro-2-isobutyl-4-methyl-4 (2H)-pyranol, beta ionone, methyl 2-(methylamino) benzoate, (E)-3-methyl-4-(2,6,6-trimethyl-2-cyclohexen-1-yl)-3-buten-2-one, (1E)-1-(2,6,6-trimethyl-2-cyclohexen-1-yl)-1-penten-3-one, 1-(2,6,6-trimethyl-1,3-cyclohexadien-1-yl)-2-buten-1-one, (2E)-1-(2,6,6-trimethyl-2-cyclohexen-1-yl)-2-buten-1-one, (2E)-1-[2,6,6-trimethyl-3-cyclohexen-1-yl]-2-buten-1-one, (2E)-1-(2,6,6-trimethyl-1-cyclohexen-1-yl)-2-buten-1-one, 2,5-dimethyl-2-indanmethanol, 2,6,6-trimethyl-3-cyclohexene-1-carboxylate, 3-(4,4-dimethyl-1-cyclohexen-1-yl)propanal, hexyl salicylate, 3,7-dimethyl-1,6-nonadien-3-ol, 3-(4-isopropylphenyl)-2-methylpropanal, verdyl acetate, geraniol, p-menth-1-en-8-ol, 4-(1,1-dimethylethyl)-1-cyclohexyle acetate, 1,1-dimethyl-2-phenylethyl acetate, 4-cyclohexyl-2-methyl-2-butanol, amyl salicylate, high cis methyl dihydrojasmonate, 3-methyl-5-phenyl-1-pentanol, verdyl proprionate, geranyl acetate, tetrahydro linalool, cis-7-p-menthanol, propyl (S)-2-(1,1-dimethylpropoxy)propanoate, 2-methoxynaphthalene, 2,2,2-trichloro-1-phenylethyl acetate, 4/3-(4-hydroxy-4-methylpentyl)-3-cyclohexene-1-carbaldehyde, amylcinnamic aldehyde, 8-decen-5-olide, 4-phenyl-2-butanone, isononyle acetate, 4-(1,1-dimethylethyl)-1-cyclohexyl acetate, verdyl isobutyrate and/or mixture of methylionones isomers;

Fruity ingredients: gamma-undecalactone, 2,2,5-trimethyl-5-pentylcyclopentanone, 2-methyl-4-propyl-1,3-oxathiane, 4-decanolide, ethyl 2-methyl-pentanoate, hexyl acetate, ethyl 2-methylbutanoate, gamma-nonalactone, allyl heptanoate, 2-phenoxyethyl isobutyrate, ethyl 2-methyl-1,3-dioxolane-2-acetate, 3-(3,3/1,1-dimethyl-5-indanyl)propanal, diethyl 1,4-cyclohexanedicarboxylate, 3-methyl-2-hexen-1-yl acetate, 1-[3,3-dimethylcyclohexyl]ethyl [3-ethyl-2-oxiranyl]acetate and/or diethyl 1,4-cyclohexane dicarboxylate;

Green ingredients: 2-methyl-3-hexanone (E)-oxime, 2,4-dimethyl-3-cyclohexene-1-carbaldehyde, 2-tert-butyl-1-cyclohexyl acetate, styrallyl acetate, allyl (2-methyl-butoxy)acetate, 4-methyl-3-decen-5-ol, diphenyl ether, (Z)-3-hexen-1-ol and/or 1-(5,5-dimethyl-1-cyclohexen-1-yl)-4-penten-1-one;

Musk ingredients: 1,4-dioxa-5,17-cycloheptadecanedione, (Z)-4-cyclopentadecen-1-one, 3-methylcyclopentadecanone, 1-oxa-12-cyclohexadecen-2-one, 1-oxa-13-cyclohexadecen-2-one, (9Z)-9-cycloheptadecen-1-one, 2-{1S}-1-[(1R)-3,3-dimethylcyclohexyl] ethoxy}-2-oxoethyl propionate 3-methyl-5-cyclopentadecen-1-one, 1,3,4,6,7,8-hexahydro-4,6,6,7,8,8- hexamethyl-cyclopenta-g-2-benzopyrane, (1S,1'R)-2-[1-(3',3'-dimethyl-1'-cyclohexyl)ethoxy]-2-methyl-propyl propanoate, oxacyclohexadecan-2-one and/or (1S,1'R)-[1-(3',3'-dimethyl-1'-cyclohexyl)ethoxycarbo-nyl]methyl propanoate;

Woody ingredients: 1-[(1RS,6SR)-2,2,6-trimethylcyclo-hexyl]-3-hexanol, 3,3-dimethyl-5-[(1R)-2,2,3-trim-ethyl-3-cyclopenten-1-yl]-4-penten-2-ol, 3,4'-dimeth-ylspiro[oxirane-2,9'-tricyclo[6.2.1.0$^{2,7}$]undec[4]ene, (1-ethoxyethoxy)cyclododecane, 2,2,9,11-tetramethyl-spiro[5.5]undec-8-en-1-yl acetate, 1-(octahydro-2,3,8, 8-tetramethyl-2-naphtalenyl)-1-ethanone, patchouli oil, terpenes fractions of patchouli oil, Clearwood®, (1'R, E)-2-ethyl-4-(2',2',3'-trimethyl-3'-cyclopenten-1'-yl)-2-buten-1-ol, 2-ethyl-4-(2,2,3-trimethyl-3-cyclopenten-1-yl)-2-buten-1-ol, methyl cedryl ketone, 5-(2,2,3-trimethyl-3-cyclopentenyl)-3-methylpentan-2-ol, 1-(2, 3,8,8-tetramethyl-1,2,3,4,6,7,8,8a-octahydronaphth-alen-2-yl)ethan-1-one and/or isobornyl acetate;

Other ingredients (e.g. amber, powdery spicy or watery): dodecahydro-3a,6,6,9a-tetramethyl-naphtho[2,1-b] furan and any of its stereoisomers, heliotropin, anisic aldehyde, eugenol, cinnamic aldehyde, clove oil, 3-(1, 3-benzodioxol-5-yl)-2-methylpropanal, 7-methyl-2H-1,5-benzodioxepin-3(4H)-one, 2,5,5-trimethyl-1,2,3,4, 4a,5,6,7-octahydro-2-naphthalenol, 1-phenylvinyl acetate, 6-methyl-7-oxa-1-thia-4-azaspiro[4.4]nonan and/or 3-(3-isopropyl-1-phenyl)butanal.

It is also understood that said ingredients may also be compounds known to release in a controlled manner various types of perfuming compounds also known as properfume or profragrance. Non-limiting examples of suitable properfume may include 4-(dodecylthio)-4-(2,6,6-trimethyl-2-cyclo-hexen-1-yl)-2-butanone, 4-(dodecylthio)-4-(2,6,6-trimethyl-1-cyclohexen-1-yl)-2-butanone, trans-3-(dodecylthio)-1-(2, 6,6-trimethyl-3-cyclohexen-1-yl)-1-butanone, 2-phenylethyl oxo(phenyl)acetate or a mixture thereof.

The perfuming ingredients may be dissolved in a solvent of current use in the perfume industry. The solvent is preferably not an alcohol. Examples of such solvents are diethyl phthalate, isopropyl myristate, Abalyn® (rosin res-ins, available from Eastman), benzyl benzoate, ethyl citrate, limonene or other terpenes, or isoparaffins. Preferably, the solvent is very hydrophobic and highly sterically hindered, like for example Abalyn® or benzyl benzoate. Preferably the perfume comprises less than 30% of solvent. More prefer-ably the perfume comprises less than 20% and even more preferably less than 10% of solvent, all these percentages being defined by weight relative to the total weight of the perfume. Most preferably, the perfume is essentially free of solvent.

Preferred perfuming ingredients are those having a high steric hindrance and in particular those from one of the following groups:

Group 1: perfuming ingredients comprising a cyclo-hexane, cyclohexene, cyclohexanone or cyclohexenone ring substituted with at least one linear or branched $C_1$ to $C_4$ alkyl or alkenyl substituent;

Group 2: perfuming ingredients comprising a cyclopen-tane, cyclopentene, cyclopentanone or cyclopentenone ring substituted with at least one linear or branched $C_4$ to $C_8$ alkyl or alkenyl substituent;

Group 3: perfuming ingredients comprising a phenyl ring or perfuming ingredients comprising a cyclohexane, cyclohexene, cyclohexanone or cyclohexenone ring substituted with at least one linear or branched $C_5$ to $C_8$ alkyl or alkenyl substituent or with at least one phenyl substituent and optionally one or more linear or branched $C_1$ to $C_3$ alkyl or alkenyl substituents;

Group 4: perfuming ingredients comprising at least two fused or linked $C_5$ and/or $C_6$ rings;

Group 5: perfuming ingredients comprising a camphor-like ring structure;

Group 6: perfuming ingredients comprising at least one C7 to C20 ring structure;

Group 7: perfuming ingredients having a log P value above 3.5 and comprising at least one tert-butyl or at least one trichloromethyl substitutent;

Examples of ingredients from each of these groups are:

Group 1: 2,4-dimethyl-3-cyclohexene-1-carbaldehyde (origin: Firmenich SA, Geneva, Switzerland), isocy-clocitral, menthone, isomenthone, Romascone® (methyl 2,2-dimethyl-6-methylene-1-cyclohexanecar-boxylate, origin: Firmenich SA, Geneva, Switzerland), nerone, terpineol, dihydroterpineol, terpenyl acetate, dihydroterpenyl acetate, dipentene, eucalyptol, hexy-late, rose oxide, Perycorolle® ((S)-1,8-p-menthadiene-7-ol, origin: Firmenich SA, Geneva, Switzerland), 1-p-menthene-4-ol, (1RS,3RS,4SR)-3-p-mentanyl acetate, (1R,2S,4R)-4,6,6-trimethyl-bicyclo[3,1,1]heptan-2-ol, Doremox® (tetrahydro-4-methyl-2-phenyl-2H-pyran, origin: Firmenich SA, Geneva, Switzerland), cyclo-hexyl acetate, cyclanol acetate, Fructalate® (1,4-cyclo-hexane diethyldicarboxylate, origin: Firmenich SA, Geneva, Switzerland), Koumalactone® ((3ARS,6SR, 7ASR)-perhydro-3,6-dimethyl-benzo[B]furan-2-one, origin: Firmenich SA, Geneva, Switzerland), Natac-tone® ((6R)-perhydro-3,6-dimethyl-benzo[B]furan-2-one, origin: Firmenich SA, Geneva, Switzerland), 2,4, 6-trimethyl-4-phenyl-1,3-dioxane, 2,4,6-trimethyl-3-cyclohexene-1-carbaldehyde;

Group 2: (E)-3-methyl-5-(2,2,3-trimethyl-3-cyclopenten-1-yl)-4-penten-2-ol (origin: Givaudan SA, Vernier, Switzerland), (1'R,E)-2-ethyl-4-(2',2',3'-trimethyl-3'-cyclopenten-1'-yl)-2-buten-1-ol (origin: Firmenich SA, Geneva, Switzerland), Polysantol® ((1'R,E)-3,3-dimethyl-5-(2',2',3'-trimethyl-3'-cyclopenten-1'-yl)-4-penten-2-ol, origin: Firmenich SA, Geneva, Switzer-land), fleuramone, Hedione® HC (methyl-cis-3-oxo-2-pentyl-1-cyclopentane acetate, origin: Firmenich SA, Geneva, Switzerland), Veloutone® (2,2,5-Trimethyl-5-pentyl-1-cyclopentanone, origin: Firmenich SA, Geneva, Switzerland), Nirvanol® (3,3-dimethyl-5-(2, 2,3-trimethyl-3-cyclopenten-1-yl)-4-penten-2-ol, ori-gin: Firmenich SA, Geneva, Switzerland), 3-methyl-5-(2,2,3-trimethyl-3-cyclopenten-1-yl)-2-pentanol (origin, Givaudan SA, Vernier, Switzerland);

Group 3: damascones, Neobutenone® (1-(5,5-dimethyl-1-cyclohexen-1-yl)-4-penten-1-one, origin: Firmenich SA, Geneva, Switzerland), nectalactone ((1'R)-2-[2-(4'-methyl-3'-cyclohexen-1'-yl)propyl]cyclopen-tanone), alpha-ionone, beta-ionone, damascenone, Dynascone® (mixture of 1-(5,5-dimethyl-1-cyclo-hexen-1-yl)-4-penten-1-one and 1-(3,3-dimethyl-1-cy-clohexen-1-yl)-4-penten-1-one, origin: Firmenich SA, Geneva, Switzerland), Dorinone® beta (1-(2,6,6-trim-ethyl-1-cyclohexen-1-yl)-2-buten-1-one, origin: Fir-menich SA, Geneva, Switzerland), Romandolide® ((1S,1'R)-[1-(3',3'-Dimethyl-1'-cyclohexyl)ethoxycar-bonyl]methyl propanoate, origin: Firmenich SA, Geneva, Switzerland), 2-tert-butyl-1-cyclohexyl acetate (origin: International Flavors and Fragrances, USA), Limbanol® (1-(2,2,3,6-tetramethyl-cyclohexyl)-3-hexanol, origin: Firmenich SA, Geneva, Switzerland), trans-1-(2,2,6-trimethyl-1-cyclohexyl)-3-hexanol (origin: Firmenich SA, Geneva, Switzerland), (E)-3-methyl-4-(2,6,6-trimethyl-2-cyclohexen-1-yl)-3-buten-2-one, terpenyl isobutyrate, Lorysia® (4-(1,1-dimethylethyl)-1-cyclohexyl acetate, origin: Firmenich SA, Geneva, Switzerland), 8-methoxy-1-p-menthene, Helvetolide® ((1S,1'R)-2-[1-(3',3'-dimethyl-1'-cyclohexyl) ethoxy]-2-methylpropyl propanoate, origin: Firmenich SA, Geneva, Switzerland), para tert-butylcyclohexanone, menthenethiol, 1-methyl-4-(4-methyl-3-pentenyl)-3-cyclohexene-1-carbaldehyde, allyl cyclohexylpropionate, cyclohexyl salicylate, 2-methoxy-4-methylphenyl methyl carbonate, ethyl 2-methoxy-4-methylphenyl carbonate, 4-ethyl-2-methoxyphenyl methyl carbonate;

Group 4: Methyl cedryl ketone (origin: International Flavors and Fragrances, USA), Verdylate, vetyverol, vetyverone, 1-(octahydro-2,3,8,8-tetramethyl-2-naphtalenyl)-1-ethanone (origin: International Flavors and Fragrances, USA), (5RS,9RS,10SR)-2,6,9,10-tetramethyl-1-oxaspiro[4.5]deca-3,6-diene and the (5RS,9SR, 10RS) isomer, 6-ethyl-2,10,10-trimethyl-1-oxaspiro [4.5]deca-3,6-diene, 1,2,3,5,6,7-hexahydro-1,1,2,3,3-pentamethyl-4-indenone (origin: International Flavors and Fragrances, USA), Hivernal® (a mixture of 3-(3, 3-dimethyl-5-indanyl)propanal and 3-(1,1-dimethyl-5-indanyl)propanal, origin: Firmenich SA, Geneva, Switzerland), Rhubofix® (3',4-dimethyl-tricyclo[6.2.1.0(2, 7)]undec-4-ene-9-spiro-2'-oxirane, origin: Firmenich SA, Geneva, Switzerland), 9/10-ethyldiene-3-oxatricyclo[6.2.1.0(2,7)]undecane, Polywood® (perhydro-5,5, 8A-trimethyl-2-naphthalenyl acetate, origin: Firmenich SA, Geneva, Switzerland), octalynol, Cetalox® (dodecahydro-3a,6,6,9a-tetramethyl-naphtho[2,1-b]furan, origin: Firmenich SA, Geneva, Switzerland), tricyclo [5.2.1.0(2,6)]dec-3-en-8-yl acetate and tricyclo[5.2.1.0 (2,6)]dec-4-en-8-yl acetate as well as tricyclo[5.2.1.0 (2,6)]dec-3-en-8-yl propanoate and tricyclo[5.2.1.0(2, 6)]dec-4-en-8-yl propanoate, (+)-(1S,2S,3S)-2,6,6-trimethyl-bicyclo[3.1.1]heptane-3-spiro-2'-cyclohexen-4'-one;

Group 5: camphor, borneol, isobornyl acetate, 8-isopropyl-6-methyl-bicyclo[2.2.2]oct-5-ene-2-carbaldehyde, camphopinene, cedramber (8-methoxy-2,6,6,8-tetramethyl-tricyclo[5.3.1.0(1,5)]undecane, origin: Firmenich SA, Geneva, Switzerland), cedrene, cedrenol, cedrol, Florex® (mixture of 9-ethylidene-3-oxatricyclo[6.2.1.0 (2,7)]undecan-4-one and 10-ethylidene-3-oxatricyclo [6.2.1.0(2,7)]undecan-4-one, origin: Firmenich SA, Geneva, Switzerland), 3-methoxy-7,7-dimethyl-10-methylene-bicyclo[4.3.1]decane (origin: Firmenich SA, Geneva, Switzerland);

Group 6: Cedroxyde® (trimethyl-13-oxabicyclo-[10.1.0]-trideca-4,8-diene, origin: Firmenich SA, Geneva, Switzerland), Ambrettolide LG ((E)-9-hexadecen-16-olide, origin: Firmenich SA, Geneva, Switzerland), Habanolide® (pentadecenolide, origin: Firmenich SA, Geneva, Switzerland), muscenone (3-methyl-(4/5)-cyclopentadecenone, origin: Firmenich SA, Geneva, Switzerland), muscone (origin: Firmenich SA, Geneva, Switzerland), Exaltolide® (pentadecanolide, origin: Firmenich SA, Geneva, Switzerland), Exaltone® (cyclopentadecanone, origin: Firmenich SA, Geneva, Switzerland), (1-ethoxyethoxy)cyclododecane (origin: Firmenich SA, Geneva, Switzerland), Astrotone, 4,8-cyclododecadien-1-one;

Group 7: Lilial® (origin: Givaudan SA, Vernier, Switzerland), rosinol.

Preferably, the perfume comprises at least 30%, preferably at least 50%, more preferably at least 60% of ingredients selected from Groups 1 to 7, as defined above. More preferably said perfume comprises at least 30%, preferably at least 50% of ingredients from Groups 3 to 7, as defined above. Most preferably said perfume comprises at least 30%, preferably at least 50% of ingredients from Groups 3, 4, 6 or 7, as defined above.

According to another preferred embodiment, the perfume comprises at least 30%, preferably at least 50%, more preferably at least 60% of ingredients having a log P above 3, preferably above 3.5 and even more preferably above 3.75.

Preferably, the perfume used in the invention contains less than 10% of its own weight of primary alcohols, less than 15% of its own weight of secondary alcohols and less than 20% of its own weight of tertiary alcohols. Advantageously, the perfume used in the invention does not contain any primary alcohols and contains less than 15% of secondary and tertiary alcohols. According to an embodiment, the oil phase (or the oil-based core) comprises:

25-100 wt % of a perfume oil comprising at least 15 wt % of high impact perfume raw materials having a Log T<−4, and 0-75 wt % of a density balancing material having a density greater than 1.07 $g/cm^3$.

"High impact perfume raw materials" should be understood as perfume raw materials having a Log T<−4. The odor threshold concentration of a chemical compound is determined in part by its shape, polarity, partial charges and molecular mass. For convenience, the threshold concentration is presented as the common logarithm of the threshold concentration, i.e., Log [Threshold] ("Log T").

A "density balancing material" should be understood as a material having a density greater than 1.07 $g/cm^3$ and having preferably low or no odor.

The odor threshold concentration of a perfuming compound is determined by using a gas chromatograph ("GC"). Specifically, the gas chromatograph is calibrated to determine the exact volume of the perfume oil ingredient injected by the syringe, the precise split ratio, and the hydrocarbon response using a hydrocarbon standard of known concentration and chain-length distribution. The air flow rate is accurately measured and, assuming the duration of a human inhalation to last 12 seconds, the sampled volume is calculated. Since the precise concentration at the detector at any point in time is known, the mass per volume inhaled is known and hence the concentration of the perfuming compound. To determine the threshold concentration, solutions are delivered to the sniff port at the back-calculated concentration. A panelist sniffs the GC effluent and identifies the retention time when odor is noticed. The average across all panelists determines the odor threshold concentration of the perfuming compound. The determination of odor threshold is described in more detail in C. Vuilleumier et al., Multidimensional Visualization of Physical and Perceptual Data Leading to a Creative Approach in Fragrance Development, Perfume & Flavorist, Vol. 33, September, 2008, pages 54-61. The nature of high impact perfume raw materials having a Log T<−4 and density balancing material having a density greater than 1.07 $g/cm^3$ are described in WO2018115250, the content of which are included by reference.

According to an embodiment, the high impact perfume raw materials having a Log T<–4 are selected from the list in Table A below.

TABLE A high impact perfume raw materials having a Log T < –4
Perfume raw materials (Log T < –4)

(+–)-1-METHOXY-3-HEXANETHIOL
4-(4-HYDROXY-1-PHENYL)-2-BUTANONE
(+–)-2-(4-METHYL-3-CYCLOHEXEN-1-YL)-2-PROPANETHIOL
2-METHOXY-4-(1-PROPENYL)-1-PHENYL ACETATE
PYRAZOBUTYLE
3-PROPYLPHENOL
1-(3-METHYL-1-BENZOFURAN-2-YL)ETHANONE
2-(3-PHENYLPROPYL)PYRIDINE
1-(3,3-DIMETHYL-1-CYCLOHEXEN-1-YL)-4-PENTEN-1-ONE (A) +
1-(5,5-DIMETHYL-1-CYCLOHEXEN-1-YL)-4-PENTEN-1-ONE
(B)
1-(5,5-DIMETHYL-1-CYCLOHEXEN-1-YL)-4-PENTEN-1-ONE
(3RS,3ARS,6SR,7ASR)-PERHYDRO-3,6-DIMETHYL-
BENZO[B]FURAN-2-ONE (A) + (3SR,3ARS,6SR,7ASR)-
PERHYDRO-3,6-DIMETHYL-BENZO[B]FURAN-2-ONE (B)
(+–)-1-(5-ETHYL-5-METHYL-1-CYCLOHEXEN-1-YL)-4-PENTEN-
1-ONE
(1'S,3'R)-1-METHYL-2-[(1',2',2'-TRIMETHYLBICYCLO[3.1.0]HEX-
3'-YL)METHYL]CYCLOPROPYL}METHANOL
(+–)-3-MERCAPTOHEXYL ACETATE
(2E)-1-(2,6,6-TRIMETHYL-1,3-CYCLOHEXADIEN-1-YL)-2-
BUTEN-1-ONE
7-METHYL-2H-1,5-BENZODIOXEPIN-3(4H)-ONE
(2E,6Z)-2,6-NONADIEN-1-OL
(4Z)-4-DODECENAL
(+–)-4-HYDROXY-2,5-DIMETHYL-3(2H)-FURANONE
METHYL 2,4-DIHYDROXY-3,6-DIMETHYLBENZOATE
3-METHYLINDOLE
(+–)-PERHYDRO-4ALPHA,8ABETA-DIMETHYL-4A-
NAPHTHALENOL
PATCHOULOL
2-METHOXY-4-(1-PROPENYL)PHENOL
(+–)-5,6-DIHYDRO-4-METHYL-2-PHENYL-2H-PYRAN (A) +
TETRAHYDRO-4-METHYLENE-2-PHENYL-2H-PYRAN (B)
4-METHYLENE-2-PHENYLTETRAHYDRO-2H-PYRAN (A) + (+–)-
4-METHYL-2-PHENYL-3,6-DIHYDRO-2H-PYRAN (B)
4-HYDROXY-3-METHOXYBENZALDEHYDE
NONYLENIC ALDEHYDE
2-METHOXY-4-PROPYLPHENOL
(2Z)-3-METHYL-5-PHENYL-2-PENTENENITRILE (A) + (2E)-3-
METHYL-5-PHENYL-2-PENTENENITRILE (B)
1-(SPIRO[4.5]DEC-6-EN-7-YL)-4-PENTEN-1-ONE (A) + 1-
(SPIRO[4.5]DEC-7-EN-7-YL)-4-PENTEN-1-ONE (B)
2-METHOXYNAPHTHALENE
(–)-(3AR,5AS,9AS,9BR)-3A,6,6,9A-
TETRAMETHYLDODECAHYDRONAPHTHO[2,1-B]FURAN
5-NONANOLIDE
(3AR,5AS,9AS,9BR)-3A,6,6,9A-
TETRAMETHYLDODECAHYDRONAPHTHO[2,1-B]FURAN
7-ISOPROPYL-2H,4H-1,5-BENZODIOXEPIN-3-ONE
COUMARIN
4-METHYLPHENYL ISOBUTYRATE
(2E)-1-(2,6,6-TRIMETHYL-1,3-CYCLOHEXADIEN-1-YL)-2-BUTEN-
1-ONE
BETA,2,2,3-TETRAMETHYL-DELTA-METHYLENE-3-
CYCLOPENTENE-1-BUTANOL
DELTA DAMASCONE ((2E)-1-[(1RS,2SR)-2,6,6-TRIMETHYL-3-
CYCLOHEXEN-1-YL]-2-BUTEN-1-ONE)
(+–)-3,6-DIHYDRO-4,6-DIMETHYL-2-PHENYL-2H-PYRAN
ANISALDEHYDE
PARACRESOL
3-ETHOXY-4-HYDROXYBENZALDEHYDE
METHYL 2-AMINOBENZOATE
ETHYL METHYLPHENYLGLYCIDATE
OCTALACTONE G
ETHYL 3-PHENYL-2-PROPENOATE
(–)-(2E)-2-ETHYL-4-[(1R)-2,2,3-TRIMETHYL-3-CYCLOPENTEN-1-
YL]-2-BUTEN-1-OL
PARACRESYL ACETATE
DODECALACTONE
TRICYCLONE

TABLE A-continued high impact perfume raw materials having a Log T < –4
Perfume raw materials (Log T < –4)

(+)-(3R,5Z)-3-METHYL-5-CYCLOPENTADECEN-1-ONE
UNDECALACTONE
(1R,4R)-8-MERCAPTO-3-P-MENTHANONE
(3S,3AS,6R,7AR)-3,6-DIMETHYLHEXAHYDRO-1-BENZOFURAN-
2(3H)-ONE
BÉTA IONONE
(+–)-6-PENTYLTETRAHYDRO-2H-PYRAN-2-ONE
(3E,5Z)-1,3,5-UNDECATRIENE
10-UNDECENAL (A) + (9E)-9-UNDECENAL (B) + (9Z)-9-
UNDECENAL (C)
(Z)-4-DECENAL
(+–)-ETHYL 2-METHYLPENTANOATE
1,2-DIALLYLDISULFANE
(2Z)-2-TRIDECENENITRILE (A) + (3Z)-3-TRIDECENENITRILE (B) +
(3E)-3-TRIDECENENITRILE (C) + (2E)-2-TRIDECENENITRILE
(D)
(+–)-2-ETHYL-4,4-DIMETHYL-1,3-OXATHIANE
(+)-(3R,5Z)-3-METHYL-5-CYCLOPENTADECEN-1-ONE
3-(4-TERT-BUTYLPHENYL)PROPANAL
ALLYL (CYCLOHEXYLOXY)ACETATE
METHYLNAPHTHYLKETONE
(+–)-(4E)-3-METHYL-4-CYCLOPENTADECEN-1-ONE (A) + (+–)-
(5E)-3-METHYL-5-CYCLOPENTADECEN-1-ONE (B) + (+–)-(5Z)-3-
METHYL-5-CYCLOPENTADECEN-1-ONE (C)
CYCLOPROPYLMETHYL (3Z)-3-HEXENOATE (A) +
CYCLOPROPYLMETHYL (3E)-3-HEXENOATE (B)
(4E)-4-METHYL-5-(4-METHYLPHENYL)-4-PENTENAL
(+–)-1-(5-PROPYL-1,3-BENZODIOXOL-2-YL)ETHANONE
4-METHYL-2-PENTYLPYRIDINE
(+–)-(E)-3-METHYL-4-(2,6,6-TRIMETHYL-2-CYCLOHEXEN-1-
YL)-3-BUTEN-2-ONE
(3ARS,5ASR,9ASR,9BRS)-3A,6,6,9A-
TETRAMETHYLDODECAHYDRONAPHTHO[2,1-B]FURAN
(2S,5R)-5-METHYL-2-(2-PROPANYL)CYCLOHEXANONE OXIME
6-HEXYLTETRAHYDRO-2H-PYRAN-2-ONE
(+–)-3-(3-ISOPROPYL-1-PHENYL)BUTANAL
METHYL 2-((1RS,2RS)-3-OXO-2-
PENTYLCYCLOPENTYL)ACETATE(A) + METHYL 2-((1RS,2SR)-
3-OXO-2-PENTYLCYCLOPENTYL)ACETATE (B)
1-(2,6,6-TRIMETHYL-1-CYCLOHEX-2-ENYL)PENT-1-EN-3-ONE
INDOL
7-PROPYL-2H,4H-1,5-BENZODIOXEPIN-3-ONE
ETHYL PRALINE
(4-METHYLPHENOXY)ACETALDEHYDE
ETHYL TRICYCLO[5.2.1.0(2,6)]DECANE-2-CARBOXYLATE
(+)-(1'S,2S,E)-3,3-DIMETHYL-5-(2',2',3'-TRIMETHYL-3'-
CYCLOPENTEN-1'-YL)-4-PENTEN-2-OL
(2R,4E)-3,3-DIMETHYL-5-[(1R)-2,2,3-TRIMETHYL-3-
CYCLOPENTEN-1-YL]-4-PENTEN-2-OL (A) + (2S,4E)-3,3-
DIMETHYL-5-[(1R)-2,2,3-TRIMETHYL-3-CYCLOPENTEN-1-YL]-
4-PENTEN-2-OL (B)
8-ISOPROPYL-6-METHYL-BICYCLO[2.2.2]OCT-5-ENE-2-
CARBALDEHYDE
METHYLNONYLACETALDEHYDE
4-FORMYL-2-METHOXYPHENYL 2-METHYLPROPANOATE
(E)-4-DECENAL
(+–)-2-ETHYL-4-(2,2,3-TRIMETHYL-3-CYCLOPENTEN-1-YL)-2-
BUTEN-1-OL
(1R,5R)-4,7,7-TRIMETHYL-6-THIABICYCLO[3.2.1]OCT-3-ENE (A) +
(1R,4R,5R)-4,7,7-TRIMETHYL-6-THIABICYCLO[3.2.1]OCTANE
(B)
(–)-(3R)-3,7-DIMETHYL-1,6-OCTADIEN-3-OL
(E)-3-PHENYL-2-PROPENENITRILE
4-METHOXYBENZYL ACETATE
(E)-3-METHYL-5-(2,2,3-TRIMETHYL-3-CYCLOPENTEN-1-YL)-4-
PENTEN-2-OL
ALLYL (3-METHYLBUTOXY)ACETATE (A) + (+–)-ALLYL (2-
METHYLBUTOXY)ACETATE
(+–)-(2E)-1-(2,6,6-TRIMETHYL-2-CYCLOHEXEN-1-YL)-2-BUTEN-
1-ONE
(1E)-1-(2,6,6-TRIMETHYL-1-CYCLOHEXEN-1-YL)-1-PENTEN-3-
ONE

According to an embodiment, perfume raw materials having a Log T<–4 are chosen in the group consisting of aldehydes, ketones, alcohols, phenols, esters lactones, ethers, epoxydes, nitriles and mixtures thereof.

According to an embodiment, perfume raw materials having a Log T<−4 comprise at least one compound chosen in the group consisting of alcohols, phenols, esters lactones, ethers, epoxydes, nitriles and mixtures thereof, preferably in amount comprised between 20 and 70% by weight based on the total weight of the perfume raw materials having a Log T<−4.

According to an embodiment, perfume raw materials having a Log T<−4 comprise between 20 and 70% by weight of aldehydes, ketones, and mixtures thereof based on the total weight of the perfume raw materials having a Log T<−4.

The remaining perfume raw materials contained in the oil-based core may have therefore a Log T>−4.

Non limiting examples of perfume raw materials having a Log T>−4 are listed in table B below.

TABLE B

| perfume raw materials having a Log T > −4<br>Perfume raw materials (Log T > −4) |
| --- |
| ETHYL 2-METHYLBUTYRATE |
| (E)-3-PHENYL-2-PROPENYL ACETATE |
| (+−)-8-SEC-BUTYLQUINOLINE (A) + (+−)-6-SEC-BUTYLQUINOLINE |
| (+−)-3-(1,3-BENZODIOXOL-5-YL)-2-METHYLPROPANAL |
| VERDYLE PROPIONATE |
| 1-(OCTAHYDRO-2,3,8,8-TETRAMETHYL-2-NAPHTALENYL)-1-ETHANONE |
| METHYL 2-((1RS,2RS)-3-OXO-2-PENTYLCYCLOPENTYL)ACETATE |
| (+−)-(E)-4-METHYL-3-DECEN-5-OL |
| 2,4-DIMETHYL-3-CYCLOHEXENE-1-CARBALDEHYDE |
| 1,3,3-TRIMETHYL-2-OXABICYCLO[2.2.2]OCTANE |
| TETRAHYDRO-4-METHYL-2-(2-METHYL-1-PROPENYL)-2H-PYRAN |
| ALDEHYDE C 12 |
| 1-OXA-12-CYCLOHEXADECEN-2-ONE (A) + 1-OXA-13-CYCLOHEXADECEN-2-ONE (B) |
| (+−)-3-(4-ISOPROPYLPHENYL)-2-METHYLPROPANAL |
| ALDEHYDE C 11 LENIQUE |
| (+−)-2,6-DIMETHYL-7-OCTEN-2-OL |
| (+−)-2,6-DIMETHYL-7-OCTEN-2-OL |
| ALLYL 3-CYCLOHEXYLPROPANOATE |
| (Z)-3-HEXENYL ACETATE |
| (2RS,5SR)-5-METHYL-2-(2-PROPANYL)CYCLOHEXANONE (A) + (2RS,5RS)-5-METHYL-2-(2-PROPANYL)CYCLOHEXANONE (B) |
| ALLYL HEPTANOATE |
| (1RS,2RS)-2-(2-METHYL-2-PROPANYL)CYCLOHEXYL ACETATE (A) + (1RS,2SR)-2-(2-METHYL-2-PROPANYL)CYCLOHEXYL ACETATE (B) |
| 1,1-DIMETHYL-2-PHENYLETHYL BUTYRATE |
| GERANYL ACETATE (A) + NERYL ACETATE (B) |
| (+−)-1-PHENYLETHYL ACETATE |
| 1,1-DIMETHYL-2-PHENYLETHYL ACETATE |
| 3-METHYL-2-BUTENYL ACETATE |
| ETHYL 3-OXOBUTANOATE (A) <=> (2Z)-ETHYL 3-HYDROXY-2-BUTENOATE (B) |
| 8-P-MENTHANOL |
| 8-P-MENTHANYL ACETATE (A) + 1-P-MENTHANYL ACETATE (B) |

14

TABLE B-continued

| perfume raw materials having a Log T > −4<br>Perfume raw materials (Log T > −4) |
| --- |
| (+−)-2-(4-METHYL-3-CYCLOHEXEN-1-YL)-2-PROPANYL ACETATE |
| (+−)-2-METHYLBUTYL BUTANOATE |
| 2-{(1S)-1-[(1R)-3,3-DIMETHYLCYCLOHEXYL]ETHOXY}-2-OXOETHYL PROPIONATE |
| 3,5,6-TRIMETHYL-3-CYCLOHEXENE-1-CARBALDEHYDE (A) + 2,4,6-TRIMETHYL-3-CYCLOHEXENE-1-CARBALDEHYDE (B) |
| 2-CYCLOHEXYLETHYL ACETATE |
| ALDEHYDE C 8 |
| ETHYL BUTANOATE |
| (+−)-(3E)-4-(2,6,6-TRIMETHYL-2-CYCLOHEXEN-1-YL)-3-BUTEN-2-ONE (A) + (3E)-4-(2,6,6-TRIMETHYL-1-CYCLOHEXEN-1-YL)-3-BUTEN-2-ONE (B); |
| 1-[(1RS,6SR)-2,2,6-TRIMETHYLCYCLOHEXYL]-3-HEXANOL |
| 1,3,3-TRIMETHYL-2-OXABICYCLO[2.2.2]OCTANE |
| 1,3,3-TRIMETHYL-2-OXABICYCLO[2.2.2]OCTANE |
| ETHYL HEXANOATE |
| UNDECANAL |
| ALDEHYDE C 10 |
| 2-PHENYLETHYL ACETATE |
| (1S,2S,4S)-1,7,7-TRIMETHYLBICYCLO[2.2.1]HEPTAN-2-OL (A) + (1S,2R,4S)-1,7,7-TRIMETHYLBICYCLO[2.2.1]HEPTAN-2-OL (B) |
| (+−)-3,7-DIMETHYL-3-OCTANOL |
| 1-METHYL-4-(2-PROPANYLIDENE)CYCLOHEXENE |
| (+)-(R)-4-(2-METHOXYPROPAN-2-YL)-1-METHYLCYCLOHEX-1-ENE |
| VERDYL ACETATE |
| (3R)-1-[(1R,6S)-2,2,6-TRIMETHYLCYCLOHEXYL]-3-HEXANOL (A) + (3S)-1-[(1R,6S)-2,2,6-TRIMETHYLCYCLOHEXYL]-3-HEXANOL (B) + (3R)-1-[(1S,6S)-2,2,6-TRIMETHYLCYCLOHEXYL]-3-HEXANOL (C) |
| (+)-(1S,1'R)-2-[1-(3',3'-DIMETHYL-1'-CYCLOHEXYL)ETHOXY]-2-METHYLPROPYL PROPANOATE |

According to an embodiment, the oil phase (or the oil-based core) comprises 2-75 wt % of a density balancing material having a density greater than 1.07 g/cm$^3$ and 25-98 wt % of a perfume oil comprising at least 15 wt % of high impact perfume raw materials having a Log T<−4.

The density of a component is defined as the ratio between its mass and its volume (g/cm$^3$).

Several methods are available to determine the density of a component.

One may refer for example to the ISO 298:1998 method to measure d20 densities of essential oils.

According to an embodiment, the density balancing material is chosen in the group consisting of benzyl salicylate, benzyl benzoate, cyclohexyl salicylate, benzyl phenylacetate, phenylethyl phenoxyacetate, triacetin, methyl and ethyl salicylate, benzyl cinnamate, and mixtures thereof.

According to a particular embodiment, the density balancing material is chosen in the group consisting of benzyl salicylate, benzyl benzoate, cyclohexyl salicylate and mixtures thereof.

According to a particular embodiment, the hydrophobic material is free of any active ingredient (such as perfume).

According to this particular embodiment, it comprises, preferably consists of hydrophobic solvents, preferably chosen in the group consisting of isopropyl myristate, tryglycerides (e.g. Neobee® MCT oil, vegetable oils), D-limonene, silicone oil, mineral oil, and mixtures thereof with optionally hydrophilic solvents preferably chosen in the group consisting of 1,4 butanediol, benzyl alcohol, triethyl citrate, triacetin, benzyl acetate, ethyl acetate, propylene glycol (1,2-propanediol), 1,3-Propanediol, dipropylene glycol, glycerol, glycol ethers and mixtures thereof.

The term "biocide" refers to a chemical substance capable of killing living organisms (e.g. microorganisms) or reducing or preventing their growth and/or accumulation. Biocides are commonly used in medicine, agriculture, forestry, and in industry where they prevent the fouling of, for example, water, agricultural products including seed, and oil pipelines. A biocide can be a pesticide, including a fungicide, herbicide, insecticide, algicide, molluscicide, miticide and rodenticide; and/or an antimicrobial such as a germicide, antibiotic, antibacterial, antiviral, antifungal, antiprotozoal and/or antiparasite.

As used herein, a "pest control agent" indicates a substance that serves to repel or attract pests, to decrease, inhibit or promote their growth, development or their activity. Pests refer to any living organism, whether animal, plant or fungus, which is invasive or troublesome to plants or animals, pests include insects notably arthropods, mites, spiders, fungi, weeds, bacteria and other microorganisms.

By "flavour ingredient or composition" it is meant here a flavouring ingredient or a mixture of flavouring ingredients, solvent or adjuvants of current use for the preparation of a flavouring formulation, i.e. a particular mixture of ingredients which is intended to be added to an edible composition or chewable product to impart, improve or modify its organoleptic properties, in particular its flavour and/or taste. Taste modulator as also encompassed in said definition. Flavouring ingredients are well known to a skilled person in the art and their nature does not warrant a detailed description here, which in any case would not be exhaustive, the skilled flavourist being able to select them on the basis of his general knowledge and according to the intended use or application and the organoleptic effect it is desired to achieve. Many of these flavouring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, can Nostrand Co., Inc. Solvents and adjuvants or current use for the preparation of a flavouring formulation are also well known in the art.

In a particular embodiment, the flavour is selected from the group consisting of terpenic flavours including citrus and mint oil, and sulfury flavours.

According to any one of the invention's embodiments, the hydrophobic active ingredient represent between about 10% and 60% w/w, or even between 15% and 45% w/w, by weight, relative to the total weight of the dispersion as obtained after step b).

According to a particular embodiment, the oil phase essentially consists of the acyl chloride and a perfume or flavor oil, and optionally a stabilizer.

In another step of the process according to the invention, the oil phase of step a) is dispersed into an aqueous solution comprising a first amino compound and optionally a stabilizer to form an oil-in-water emulsion.

The mean droplet size of the emulsion is preferably comprised between 1 and 1000 microns, more preferably between 1 and 500 microns, and even more preferably between 5 and 50 microns.

According to a particular embodiment, the first aminocompound is an amino-acid, preferably chosen in the group consisting of L-Lysine, L-Arginine, L-Histidine, L-Tryptophane, L-Serin, L-Glutamine, L-Threonine and mixtures thereof, preferably L-Lysine, L-Arginine, L-Histidine, L-Tryptophane and mixtures thereof, more preferably L-Lysine, L-Arginine, L-Histidine and mixtures thereof.

The amino-acid has preferably two nucleophilic groups.

The first amino compound may be chosen in the group consisting of L-Lysine, L-Lysine ethyl ester, guanidine carbonate, chitosan, 3-aminopropyltriethoxysilane, and mixtures thereof. According to a particular embodiment, the first amino compound is L-Lysine.

According to the invention, a stabilizer is added in the water phase and/or the oil phase to form the emulsion. According to an embodiment, the stabilizer is a colloidal stabilizer.

The colloidal stabilizer can be a molecular emulsifier (standard emulsion) or solid particles (Pickering emulsion).

By "stabilizer", it is meant a compound capable to stabilize oil/water interface as an emulsion.

According to a particular embodiment, the stabilizer is a biopolymer.

By "biopolymers" it is meant biomacromolecules produced by living organisms. Biopolymers are characterized by molecular weight distributions ranging from 1,000 (1 thousand) to 1,000,000,000 (1 billion) Daltons. These macromolecules may be carbohydrates (sugar based) or proteins (amino-acid based) or a combination of both (gums) and can be linear or branched.

According to an embodiment, the colloid stabilizer or the emulsifier is chosen in the group consisting of gum Arabic, modified starch, polyvinyl alcohol, polyvinylpyrolidone (PVP), carboxymethylcellulose (CMC), anionic polysaccharides, acrylamide copolymer, inorganic particles, protein such as soy protein, rice protein, whey protein, white egg albumin, sodium caseinate, gelatin, bovine serum albumin, hydrolyzed soy protein, hydrolyzed sericin, pseudocollagen, silk protein, sericin powder, and mixtures thereof.

When the colloidal stabilizer is added in the oil phase, it is preferably chosen in the group consisting of protein such as soy protein, rice protein, whey protein, white egg albumin, sodium caseinate, gelatin, bovine serum albumin, hydrolyzed soy protein, hydrolyzed sericin, pseudocollagen, silk protein, sericin powder, and mixtures thereof.

According to a particular embodiment, the stabilizer is a biopolymer chosen in the group consisting of protein such as whey protein, casein, sodium caseinate, bovine serum albumin, and mixtures thereof.

When added in the oil phase, the stabilizer can be predispersed in an inert solvent such as benzyl benzoate or can be mixed to the active ingredient, preferably comprising a perfume oil.

The stabilizer and acyl chloride can be premixed and can be heated at a temperature between for example 10 and 80° C. before mixing with the hydrophobic material, preferably comprising a perfume oil.

When the colloidal stabilizer is added in the water phase, it is preferably chosen in the group consisting of gum Arabic, modified starch, polyvinyl alcohol, polyvinylpyrolidone (PVP), carboxymethylcellulose (CMC), anionic polysaccharides, acrylamide copolymer, inorganic particles, protein such as soy protein, rice protein, whey protein, white egg albumin, sodium caseinate, gelatin, bovine serum albumin, hydrolyzed soy protein, hydrolyzed sericin, Pseudo-collagen, Silk protein, sericin powder, and mixtures thereof.

According to any one of the above embodiments of the present invention, the dispersion comprises between about 0.01% and 3.0% of at least colloid stabilizer, percentage being expressed on a w/w basis relative to the total weight of the oil-in-water emulsion as obtained after step b). In still another aspect of the invention, the dispersion comprises between about 0.05% and 2.0%, preferably between 0.05 and 1% of at least a colloid stabilizer. In still another aspect of the invention, the dispersion comprises between about 0.1% and 1.6%, preferably between 0.1% and 0.8% by weight of at least a colloid stabilizer.

In another step of the process according to an embodiment, a second amino compound is added to the oil-in-water emulsion obtained in step b).

Without being bound by any theory, the inventors are of the opinion that the first amino compound will react with the acyl chloride to form a polyamide and the second amino compound will react with remaining acyl chloride groups of the acyl chloride.

As non-limiting examples, the second amino-compound is chosen in the group consisting of a xylylene diamine, 1,2-diaminocyclohexane, 1,4-diaminocyclohexane, L-lysine, L-Lysine ethyl ester, polyetheramines (Jeffamine®), ethylene diamine, diethylene triamine, spermine, spermidine, polyamidoamine (PAMAM), guanidine carbonate, chitosan, tris-(2-aminoethyl)amine, 3-aminopropyltriethoxysilane, L-arginine, an amine having a disulfide bond such as cystamine, cystamine hydrochloride, cystine, cystine hydrochloride, cystine dialkyl ester, cystine dialkyl ester hydrochloride and mixtures thereof.

According to an embodiment, the second amino-compound is an amine having a disulfide bond and is chosen in the group consisting of cystamine, cystamine hydrochloride, cystine, cystine hydrochloride, cystine dialkyl ester, cystine dialkyl ester hydrochloride and mixtures thereof.

According to another embodiment, the second amino-compound is chosen in the group consisting of xylylene diamine, 1,2-diaminocyclohexane, 1,4-diaminocyclohexane, L-lysine, L-Lysine ethyl ester, Jeffamine®, ethylene diamine, diethylene triamine, spermine, spermidine, polyamidoamine (PAMAM), guanidine carbonate, chitosan, tris-(2-aminoethyl)amine, 3-aminopropyltriethoxysilane, L-arginine and mixtures thereof.

According to a particular embodiment, the second amino-compound is a mixture of two amino-compounds, preferably a mixture of ethylene diamine and diethylene triamine.

According to a particular embodiment, the first amino compound and the second amino compound are the same.

According to another particular embodiment, the first amino compound and the second amino compound are different.

According to an embodiment, the weight ratio between the first amino compound and the second amino compound is comprised between 0.5 and 25, preferably between 1.3 and 10, more preferably between 1.3 and 7.

The process of the invention is notably characterized by the fact that two amino compounds are added, preferably successively, during the process, the first amino compound being added in step b) and preferably at least a second amino compound being added once the emulsion is formed. Indeed, without being bound by any theory, the inventors observed that the combination of both amino compounds led to stable microcapsules in consumer products.

The amount of the second amino compound used is typically adjusted so that the molar ratio between the functional groups $NH_2$ of the second amino compound and the functional groups COCl of the acyl chloride is comprised between 0.01 and 7.5, preferably from 0.1 to 3.0.

The amount of the first amino compound used is typically adjusted so that the molar ratio between the functional groups $NH_2$ of the first amino compound and the functional groups COCl of the acyl chloride is comprised between 0.2 and 3, preferably from 0.5 to 2.

According to an embodiment, a base is added at the end of step c) to adjust the pH. One may cite as non-limiting examples guanidine carbonate, sodium bicarbonate or triethanolamine.

According to a particular embodiment, the base is not an amino-compound.

Base is preferably added in an amount comprised between 0.1% and 10% by weight based on the oil-in-water emulsion, more preferably between 0.5% and 5%.

This is followed by a curing step c) which allows ending up with microcapsules in the form of a slurry. According to a preferred embodiment, to enhance the kinetics, said step is performed at a temperature comprised between 5 and 90° C., possibly under pressure, for 1 to 8 hours. More preferably it is performed at between 10 and 80° C. for between 30 minutes and 5 hours.

According to a particular embodiment, no polyol is added at any step of the process.

Optional outer coating: According to a particular embodiment of the invention, at the end of step d) or during step d), one may also add to the invention's slurry a polymer selected from the group consisting of a non-ionic polysaccharide, a cationic polymer and mixtures thereof to form an outer coating to the microcapsule.

Non-ionic polysaccharide polymers are well known to a person skilled in the art and are described for instance in WO2012/007438 page 29, lines 1 to 25 and in WO2013/026657 page 2, lines 12 to 19 and page 4, lines 3 to 12. Preferred non-ionic polysaccharides are selected from the group consisting of locust bean gum, xyloglucan, guar gum, hydroxypropyl guar, hydroxypropyl cellulose and hydroxypropyl methyl cellulose.

Cationic polymers are well known to a person skilled in the art. Preferred cationic polymers have cationic charge densities of at least 0.5 meq/g, more preferably at least about 1.5 meq/g, but also preferably less than about 7 meq/g, more preferably less than about 6.2 meq/g. The cationic charge density of the cationic polymers may be determined by the Kjeldahl method as described in the US Pharmacopoeia under chemical tests for Nitrogen determination. The preferred cationic polymers are chosen from those that contain units comprising primary, secondary, tertiary and/or quaternary amine groups that can either form part of the main polymer chain or can be borne by a side substituent directly connected thereto. The weight average (Mw) molecular weight of the cationic polymer is preferably between 10,000 and 3.5M Dalton, more preferably between 50,000 and 1.5M Dalton. According to a particular embodiment, one will use cationic polymers based on acrylamide, methacrylamide, N-vinylpyrrolidone, quaternized N,N-dimethylaminomethacrylate, diallyldimethylammonium chloride, quaternized vinylimidazole (3-methyl-1-vinyl-1H-imidazol-3-ium chloride), vinylpyrrolidone, acrylamidopropyltrimonium chloride, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride. Preferably copolymers shall be selected from the group consisting of polyquaternium-5, polyquaternium-6, polyquaternium-7, polyquaternium10, polyquaternium-11, polyquaternium-16, polyquaternium-22, polyquaternium-28, polyquaternium-43, polyquaternium-44, polyquaternium-46, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride. As specific examples of commercially available products, one may cite Salcare® SC60 (cationic copolymer of acrylamidopropyltrimonium chloride and acrylamide, origin: BASF) or Luviquat®, such as the PQ 11N, FC 550 or Style (polyquaternium-11 to 68 or quaternized copolymers of vinylpyrrolidone origin: BASF), or also the Jaguar® (C13S or C17, origin Rhodia).

According to any one of the above embodiments of the invention, there is added an amount of polymer described above comprised between about 0% and 5% w/w, or even between about 0.1% and 2% w/w, percentage being expressed on a w/w basis relative to the total weight of the slurry as obtained after step c) or d). It is clearly understood by a person skilled in the art that only part of said added polymers will be incorporated into/deposited on the microcapsule shell.

Another object of the invention is a process for preparing a microcapsule powder comprising the steps as defined above and an additional step d) or e) consisting of submitting the slurry obtained in step c) or d) to a drying, like spray-drying, to provide the microcapsules as such, i.e. in a powdery form. It is understood that any standard method known by a person skilled in the art to perform such drying is also applicable. In particular the slurry may be spray-dried preferably in the presence of a polymeric carrier material such as polyvinyl acetate, polyvinyl alcohol, dextrins, natural or modified starch, vegetable gums, pectins, xanthans, alginates, carragenans or cellulose derivatives to provide microcapsules in a powder form.

According to a particular embodiment, the carrier material contains free perfume oil which can be the same or different from the perfume from the core of the microcapsules.

Another object of the invention is a polyamide microcapsule slurry obtainable by the process as described above.

Polyamide Microcapsule

The composition of the polyamide shell enables to provide microcapsules that show the desired stability in the product base (e.g. counteracts efficiently the extraction of the perfume by the surfactants of the consumer product).

Thus, another object of the invention is a polyamide core-shell comprising:
an oil based core comprising a hydrophobic material, preferably a perfume, and
a polyamide shell comprising:
an acyl chloride,
a first amino compound, and
a second amino compound.

According to an embodiment, the shell comprises a stabilizer, preferably a biopolymer.

According to an embodiment, the shell does not comprise a polyol.

According to a particular embodiment, the polyamide core-shell microcapsule comprises:
an oil based core comprising a hydrophobic material, preferably a perfume, and a polyamide shell comprising:
an acyl chloride, preferably in an amount comprised between 5 and 98%, preferably between 20 and 98%, more preferably between 30 and 85% w/w
a first amino compound, preferably in an amount comprised between 1% and 50% w/w, preferably between 7 and 40% w/w;
a second amino compound, preferably in an amount comprised between 1% and 50% w/w, preferably between 2 and 25% w/w;
a stabilizer, preferably a biopolymer, preferably in an amount comprised between 0 and 90% w/w, preferably between 0.1 and 75% w/w, more preferably between 1 and 70% w/w.

It should be understood that the total of shell components equals 100%.

According to a particular embodiment, the polyamide core-shell microcapsule comprises:
an oil based core comprising a hydrophobic material, preferably a perfume, and
a polyamide shell comprising:
an acyl chloride,
a first amino-compound being an amino-acid, preferably chosen in the group consisting of L-Lysine, L-Arginine, L-Histidine, L-Tryptophane and/or mixture thereof.
a second amino compound chosen in the group consisting of ethylene diamine, diethylene triamine, cystamine and mixtures thereof, and
a biopolymer chosen in the group consisting of casein, sodium caseinate, bovin serum albumin, whey protein, and mixtures thereof.

The embodiments described previously regarding the nature of the hydrophobic material, the stabilizer, the acyl chloride, the first amino compound and the second amino compound also apply for the polyamide microcapsules defined above.

Without being bound by any theory, the inventors are of the opinion that the presence of the stabilizer, preferably a biopolymer forms a composite structure with the polyamide and more particularly with the acid chloride compound.

According to a particular embodiment, the first amino compound and the second amino compound comprised in the shell of the polyamide microcapsules are different.

According to a particular embodiment, the polyamide microcapsule comprises an inner shell of polyurea.

The composition of the shell can be quantified for example by elemental analysis and identified by solid-state NMR which are two well-known techniques for the person skilled in the art.

Multiple Microcapsules System

According to an embodiment, the microcapsules of the invention (first type of microcapsule) can be used in combination with a second type of microcapsules.

Another object of the invention is a microcapsule delivery system comprising:
the microcapsules of the present invention as a first type of microcapsule, and
a second type of microcapsules, wherein the first type of microcapsule and the second type of microcapsules differ in their hydrophobic material and/or their wall material and/or in their coating material.

As non-limiting examples, the nature of the polymeric shell of the second type of microcapsules can vary. As non-limiting examples, the shell of the second type of microcapsules can be aminoplast-based, polyurea-based or polyurethane-based. The shell of the second type of microcapsules can also be hybrid, namely organic-inorganic such as a hybrid shell composed of at least two types of inorganic particles that are cross-linked, or yet a shell resulting from the hydrolysis and condensation reaction of a polyalkoxysilane macro-monomeric composition.

According to an embodiment, the shell of the second type of microcapsules comprises an aminoplast copolymer, such as melamine-formaldehyde or urea-formaldehyde or cross-linked melamine formaldehyde or melamine glyoxal.

According to another embodiment the shell of the second type of microcapsules is polyurea-based made from, for example but not limited to isocyanate-based monomers and amine-containing crosslinkers such as guanidine carbonate and/or guanazole. Preferred polyurea microcapsules comprise a polyurea wall which is the reaction product of the polymerisation between at least one polyisocyanate comprising at least two isocyanate functional groups and at least one reactant selected from the group consisting of an amine (for example a water soluble guanidine salt and guanidine); a colloidal stabilizer or emulsifier; and an encapsulated perfume. However, the use of an amine can be omitted.

According to a particular embodiment the colloidal stabilizer includes an aqueous solution of between 0.1% and 0.4% of polyvinyl alcohol, between 0.6% and 1% of a cationic copolymer of vinylpyrrolidone and of a quaternized vinylimidazol (all percentages being defined by weight relative to the total weight of the colloidal stabilizer). According to another embodiment, the emulsifier is an anionic or amphiphilic biopolymer preferably chosen from the group consisting of gum Arabic, soy protein, gelatin, sodium caseinate and mixtures thereof.

According to a particular embodiment, the shell of the second type of microcapsules comprises an inner layer of polyurea and an outer layer of hydrogel, preferably made of gelatin and gum Arabic.

According to a particular embodiment, the shell of the second type of microcapsules comprises an inner layer of polyurea and an outer layer of cross-linked protein, preferably a mixture of sodium caseinate and whey protein.

According to another embodiment, the shell of the second type of microcapsules is polyurethane-based made from, for example but not limited to polyisocyanate and polyols, polyamide, polyester, etc.

The preparation of an aqueous dispersion/slurry of core-shell microcapsules is well known by a skilled person in the art. In one aspect, said microcapsule wall material may comprise any suitable resin and especially including melamine, glyoxal, polyurea, polyurethane, polyamide, polyester, etc. Suitable resins include the reaction product of an aldehyde and an amine, suitable aldehydes include, formaldehyde and glyoxal. Suitable amines include melamine, urea, benzoguanamine, glycoluril, and mixtures thereof. Suitable melamines include, methylol melamine, methylated methylol melamine, imino melamine and mixtures thereof. Suitable ureas include, dimethylol urea, methylated dimethylol urea, urea-resorcinol, and mixtures thereof. Suitable materials for making may be obtained from one or more of the following companies Solutia Inc. (St Louis, Missouri U.S.A.), Cytec Industries (West Paterson, New Jersey U.S.A.), Sigma-Aldrich (St. Louis, Missouri U.S.A.).

According to a particular embodiment, the second type of core-shell microcapsule is a formaldehyde-free capsule. A typical process for the preparation of aminoplast formaldehyde-free microcapsules slurry comprises the steps of 1) preparing an oligomeric composition comprising the reaction product of, or obtainable by reacting together

22 a) a polyamine component in the form of melamine or of a mixture of melamine and at least one $C_1$-$C_4$ compound comprising two $NH_2$ functional groups;

b) an aldehyde component in the form of a mixture of glyoxal, a $C_{4-6}$ 2,2-dialkoxy-ethanal and optionally a glyoxalate, said mixture having a molar ratio glyoxal/$C_{4-6}$ 2,2-dialkoxy-ethanal comprised between 1/1 and 10/1; and c) a protic acid catalyst;

2) preparing an oil-in-water dispersion, wherein the droplet size is comprised between 1 and 600 um, and comprising:

i. an oil;

ii. a water medium iii. at least an oligomeric composition as obtained in step 1;

iv. at least a cross-linker selected amongst

A) $C_4$-$C_{12}$ aromatic or aliphatic di- or tri-isocyanates and their biurets, triurets, trimmers, trimethylol propane-adduct and mixtures thereof, and/or B) a di- or tri-oxiran compounds of formula
A-(oxiran-2-ylmethyl)$_n$
wherein n stands for 2 or 3 and 1 represents a $C_2$-$C_6$ group optionally comprising from 2 to 6 nitrogen and/or oxygen atoms;

v. optionally a $C_1$-$C_4$ compounds comprising two $NH_2$ functional groups;

3) Heating said dispersion;

4) Cooling said dispersion.

This process is described in more details in WO 2013/068255, the content of which is included by reference.

According to another embodiment, the shell of the second type of microcapsules slurry is polyurea- or polyurethane-based. Examples of processes for the preparation of polyurea and polyureathane-based microcapsule slurry are for instance described in WO2007/004166, EP 2300146, EP2579976 the contents of which is also included by reference. Typically a process for the preparation of polyurea or polyurethane-based microcapsule slurry include the following steps:

a) Dissolving at least one polyisocyanate having at least two isocyanate groups in an oil to form an oil phase;

b) Preparing an aqueous solution of an emulsifier or colloidal stabilizer to form a water phase;

c) Adding the oil phase to the water phase to form an oil-in-water dispersion, wherein the mean droplet size is comprised between 1 and 500 μm, preferably between 5 and 50 μm;

d) Applying conditions sufficient to induce interfacial polymerisation and form microcapsules in form of a slurry.

Perfuming Composition/Consumer Products

The microcapsules of the invention can be used in combination with active ingredients. An object of the invention is therefore a composition comprising:

(i) microcapsules as defined above;

(ii) an active ingredient, preferably chosen in the group consisting of a cosmetic ingredient, skin caring ingredient, perfume ingredient, flavor ingredient, malodour counteracting ingredient, bactericide ingredient, fungicide ingredient, pharmaceutical or agrochemical ingredient, a sanitizing ingredient, an insect repellent or attractant, and mixtures thereof.

The microcapsules of the invention can be used for the preparation of perfuming or flavouring compositions which are also an object of the invention.

The capsules of the invention show a good performance in terms of stability in challenging medium.

Another object of the present invention is a perfuming composition comprising:

(i) microcapsules as defined above, wherein the oil comprises a perfume;

(ii) at least one ingredient selected from the group consisting of a perfumery carrier, a perfumery co-ingredient and mixtures thereof;

(iii) optionally at least one perfumery adjuvant.

As liquid perfumery carrier one may cite, as non-limiting examples, an emulsifying system, i.e. a solvent and a surfactant system, or a solvent commonly used in perfumery. A detailed description of the nature and type of solvents commonly used in perfumery cannot be exhaustive. However, one can cite as non-limiting examples solvents such as dipropyleneglycol, diethyl phthalate, isopropyl myristate, benzyl benzoate, 2-(2-ethoxyethoxy)-1-ethanol or ethyl citrate, which are the most commonly used. For the compositions which comprise both a perfumery carrier and a perfumery co-ingredient, other suitable perfumery carriers than those previously specified, can be also ethanol, water/ethanol mixtures, limonene or other terpenes, isoparaffins such as those known under the trademark Isopar (origin: Exxon Chemical) or glycol ethers and glycol ether esters such as those known under the trademark Dowanol (origin: Dow Chemical Company). By "perfumery co-ingredient" it is meant here a compound, which is used in a perfuming preparation or a composition to impart a hedonic effect and which is not a microcapsule as defined above. In other words such a co-ingredient, to be considered as being a perfuming one, must be recognized by a person skilled in the art as being able to at least impart or modify in a positive or pleasant way the odor of a composition, and not just as having an odor.

The nature and type of the perfuming co-ingredients present in the perfuming composition do not warrant a more detailed description here, which in any case would not be exhaustive, the skilled person being able to select them on the basis of his general knowledge and according to the intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that said co-ingredients may also be compounds known to release in a controlled manner various types of perfuming compounds.

By "perfumery adjuvant" we mean here an ingredient capable of imparting additional added benefit such as a color, a particular light resistance, chemical stability, etc. A detailed description of the nature and type of adjuvant commonly used in perfuming bases cannot be exhaustive, but it has to be mentioned that said ingredients are well known to a person skilled in the art.

Preferably, the perfuming composition according to the invention comprises between 0.01 and 30% by weight of microcapsules as defined above.

The invention's microcapsules can advantageously be used in many application fields and used in consumer products. Microcapsules can be used in liquid form applicable to liquid consumer products as well as in powder form, applicable to powder consumer products.

According to a particular embodiment, the consumer product as defined above is liquid and comprises:

a) from 2 to 65% by weight, relative to the total weight of the consumer product, of at least one surfactant;

b) water or a water-miscible hydrophilic organic solvent; and c) microcapsule slurry as defined above, d) optionally non-encapsulated perfume.

According to a particular embodiment, the consumer product as defined above is in a powder form and comprises:

a) from 2 to 65% by weight, relative to the total weight of the consumer product, of at least one surfactant;

b) microcapsule powder as defined above.

c) optionally perfume powder that is different from the microcapsules defined above.

In the case of microcapsules including a perfume oil-based core, the products of the invention, can in particular be of used in perfumed consumer products such as product belonging to fine fragrance or "functional" perfumery. Functional perfumery includes in particular personal-care products including hair-care, body cleansing, skin care, hygiene-care as well as home-care products including laundry care and air care. Consequently, another object of the present invention consists of a perfumed consumer product comprising as a perfuming ingredient, the microcapsules defined above or a perfuming composition as defined above. The perfume element of said consumer product can be a combination of perfume microcapsules as defined above and free or non-encapsulated perfume, as well as other types of perfume microcapsule than those here-disclosed.

In particular a liquid consumer product comprising:

a) from 2 to 65% by weight, relative to the total weight of the consumer product, of at least one surfactant;

b) water or a water-miscible hydrophilic organic solvent; and c) a perfuming composition as defined above is another object of the invention.

Also a powder consumer product comprising (a) from 2 to 65% by weight, relative to the total weight of the consumer product, of at least one surfactant; and (b) a perfuming composition as defined above is part of the invention.

The invention's microcapsules can therefore be added as such or as part of an invention's perfuming composition in a perfumed consumer product.

For the sake of clarity, it has to be mentioned that, by "perfumed consumer product" it is meant a consumer product which is expected to deliver among different benefits a perfuming effect to the surface to which it is applied (e.g. skin, hair, textile, paper, or home surface) or in the air (air-freshener, deodorizer etc). In other words, a perfumed consumer product according to the invention is a manufactured product which comprises a functional formulation also referred to as "base", together with benefit agents, among which an effective amount of microcapsules according to the invention.

The nature and type of the other constituents of the perfumed consumer product do not warrant a more detailed description here, which in any case would not be exhaustive, the skilled person being able to select them on the basis of his general knowledge and according to the nature and the desired effect of said product. Base formulations of consumer products in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

Non-limiting examples of suitable perfumed consumer product can be a perfume, such as a fine perfume, a cologne, an after-shave lotion, a body-splash; a fabric care product, such as a liquid or solid detergent, tablets and pods, a fabric softener, a dryer sheet, a fabric refresher, an ironing water, or a bleach; a personal-care product, such as a hair-care product (e.g. a shampoo, hair conditioner, a colouring preparation or a hair spray), a cosmetic preparation (e.g. a vanishing cream, body lotion or a deodorant or antiperspirant), or a skin-care product (e.g. a perfumed soap, shower or bath mousse, body wash, oil or gel, bath salts, or a hygiene product); an air care product, such as an air freshener or a "ready to use" powdered air freshener; or a home care product, such all-purpose cleaners, liquid or power or tablet dishwashing products, toilet cleaners or products for cleaning various surfaces, for example sprays & wipes intended for the treatment/refreshment of textiles or hard surfaces (floors, tiles, stone-floors etc.); a hygiene product such as sanitary napkins, diapers, toilet paper.

Another object of the invention is a consumer product comprising:

a personal care active base, and microcapsules as defined above or the perfuming composition as defined above, wherein the consumer product is in the form of a personal care composition.

Personal care active base in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

The personal care composition is preferably chosen in the group consisting of a hair-care product (e.g. a shampoo, hair conditioner, a colouring preparation or a hair spray), a cosmetic preparation (e.g. a vanishing cream, body lotion or a deodorant or antiperspirant), or a skin-care product (e.g. a perfumed soap, shower or bath mousse, body wash, oil or gel, bath salts, or a hygiene product);

Another object of the invention is a consumer product comprising:

a home care or a fabric care active base, and microcapsules as defined above or the perfuming composition as defined above, wherein the consumer product is in the form of a home care or a fabric care composition.

Home care or fabric care active base in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

Preferably, the consumer product comprises from 0.1 to 15 wt %, more preferably between 0.2 and 5 wt % of the microcapsules of the present invention, these percentages being defined by weight relative to the total weight of the consumer product. Of course the above concentrations may be adapted according to the benefit effect desired in each product.

According to a particular embodiment, the consumer product in which the microcapsules are incorporated has a pH lower than 4.5.

Fabric Softener

An object of the invention is a consumer product in the form of a fabric softener composition comprising:

a fabric softener active base; preferably chosen in the group consisting of dialkyl quaternary ammonium salts, dialkyl ester quaternary ammonium salts (esterquats), Hamburg esterquat (HEQ), TEAQ (triethanolamine quat), cationic guars, silicones and mixtures thereof, preferably in an amount comprised between 85 and 99.95% by weight based on the total weight of the composition, a microcapsule slurry as defined above, preferably in an amount comprised between 0.05 to 15 wt %, more preferably between 0.1 and 5 wt % by weight based on the total weight of the composition.

Liquid Detergent

An object of the invention is a consumer product in the form of a liquid detergent composition comprising:

a liquid detergent active base; preferably chosen in the group consisting of anionic surfactant such as alkylbenzenesulfonate (ABS), secondary alkyl sulfonate (SAS), primary alcohol sulfate (PAS), lauryl ether sulfate (LES), methyl ester sulfonate (MES) and nonionic surfactant such as alkyl amines, alkanolamide, fatty alcohol poly(ethylene glycol) ether, fatty alcohol ethoxylate (FAE), ethylene oxide (EO) and propylene oxide (PO) copolymers, amine oxydes, alkyl polyglucosides, alkyl polyglucosamides, preferably in an amount comprised between 85 and 99.95% by weight based on the total weight of the composition, a microcapsule slurry as defined above, preferably in an amount comprised between 0.05 to 15 wt %, more preferably between 0.1 and 5 wt % by weight based on the total weight of the composition.

Solid Detergent

An object of the invention is a consumer product in the form of a solid detergent composition comprising:

a solid detergent active base; preferably chosen in the group consisting of anionic surfactant such as alkylbenzenesulfonate (ABS), secondary alkyl sulfonate (SAS), primary alcohol sulfate (PAS), lauryl ether sulfate (LES), methyl ester sulfonate (MES) and nonionic surfactant such as alkyl amines, alkanolamide, fatty alcohol poly(ethylene glycol) ether, fatty alcohol ethoxylate (FAE), ethylene oxide (EO) and propylene oxide (PO) copolymers, amine oxydes, alkyl polyglucosides, alkyl polyglucosamides, preferably in an amount comprised between 85 and 99.95% by weight based on the total weight of the composition, a microcapsule slurry as defined above, preferably in an amount comprised between 0.05 to 15 wt %, more preferably between 0.1 and 5 wt % by weight based on the total weight of the composition.

Solid Scent Booster

An object of the invention is a consumer product in the form of a solid scent booster comprising:

a solid carrier, preferably chosen in the group consisting of urea, sodium chloride, sodium sulphate, sodium acetate, zeolite, sodium carbonate, sodium bicarbonate, clay, talc, calcium carbonate, magnesium sulfate, gypsum, calcium sulfate, magnesium oxide, zinc oxide, titanium dioxide, calcium chloride, potassium chloride, magnesium chloride, zinc chloride, saccharides such as sucrose, mono-, di-, and polysaccharides and derivatives such as starch, cellulose, methyl cellulose, ethyl cellulose, propyl cellulose, polyols/sugar alcohols such as sorbitol, maltitol, xylitol, erythritol, and isomalt, PEG, PVP, citric acid or any water soluble solid acid, fatty alcohols or fatty acids and mixtures thereof.

microcapsules as defined above, in a powdered form, preferably in an amount comprised between 0.05 to 15 wt %, more preferably between 0.1 and 5 wt % by weight based on the total weight of the composition.

Liquid Scent Booster

An object of the invention is a consumer product in the form of a liquid scent booster comprising:

an aqueous phase, a surfactant system essentially consisting of one or more than one non-ionic surfactant, wherein the surfactant system has a mean HLB between 10 and 14, preferably chosen in the group consisting of ethoxylated aliphatic alcohols, POE/PPG (polyoxyethylene and polyoxypropylene) ethers, mono and polyglyceryl esters, sucrose ester compounds, polyoxyethylene hydroxylesters, alkyl polyglucosides, amine oxides and combinations thereof;

a linker chosen in the group consisting of alcohols, salts and esters of carboxylic acids, salts and esters of hydroxyl carboxylic acids, fatty acids, fatty acid salts, glycerol fatty acids, surfactant having an HLB less than 10 and mixtures thereof, and microcapsules as defined above, in the form of a slurry, preferably in an amount comprised between 0.05 to 15 wt %, more preferably between 0.1 and 5 wt % by weight based on the total weight of the composition.

Shampoo/Shower Gel

An object of the invention is a consumer product in the form of a shampoo or a shower gel composition comprising:

a shampoo or a shower gel active base; preferably chosen in the group consisting of sodium alkylether sulfate, ammonium alkylether sulfates, alkylamphoacetate, cocamidopropyl betaine, cocamide MEA, alkylglucosides and aminoacid based surfactants and mixtures thereof, preferably in an amount comprised between 85 and 99.95% by weight based on the total weight of the composition, a microcapsule slurry as defined above, preferably in an amount comprised between 0.05 to 15 wt %, more preferably between 0.1 and 5 wt % by weight based on the total weight of the composition.

Rinse-Off Conditioner

An object of the invention is a consumer product in the form of a rinse-off conditioner composition comprising:

a rinse-off conditioner active base; preferably chosen in the group consisting of cetyltrimonium chloride, stearyl trimonium chloride, benzalkonium chloride, behentrimonium chloride and mixture thereof, preferably in an amount comprised between 85 and 99.95% by weight based on the total weight of the composition, a microcapsule slurry as defined above, preferably in an amount comprised between 0.05 to 15 wt %, more preferably between 0.1 and 5 wt % by weight based on the total weight of the composition.

Hair Coloration

An object of the invention is a consumer product in the form of an oxidative hair coloring composition comprising:

an oxidizing phase comprising an oxidizing agent and an alkaline phase comprising an alkakine agent, a dye precursor and a coupling compound; wherein said dye precursor and said coupling compound form an oxidative hair dye in the presence of the oxidizing agent, preferably in an amount comprised between 85 and 99.95% by weight based on the total weight of the composition, a microcapsule slurry as defined above, preferably in an amount comprised between 0.05 to 15 wt %, more preferably between 0.1 and 5 wt % by weight based on the total weight of the composition.

By "oxidative hair coloring composition", it is meant a composition comprising two groups of colorless dye molecules: the dye precursor and the coupling agent. Upon reaction with each other through an oxidation process, they form a wide range of colored molecules (dyes) that are then trapped into the hair due their size. In other words, the dye precursor and the coupling compound form an oxidative hair dye in the presence of the oxidizing agent.

"Dye precursor" and "oxidative dye precursor" are used indifferently in the present invention.

Dye precursors can be aromatic compounds derived from benzene substituted by at least two electron donor groups such as $NH_2$ and OH in para or ortho positions to confer the property of easy oxidation.

According to an embodiment, dye precursors are chosen in the group consisting of p-phenylene diamine, 2,5-diamino toluene, N,N-bis(2-hydroxymethyl)-p-phenylene diamine, 4-aminophenol, 1,4-diamino-benzene, and mixtures thereof.

The primary dye precursors is used in combination with coupling agents. Coupling agents are preferably aromatic compounds derived from benzene and substituted by groups such as $NH_2$ and OH in the meta position and do not produce color singly, but which modify the color, shade or intensity of the colors developed by the dye precursor.

According to an embodiment, the coupling agent is chosen in the group consisting of resorcinol, 2-methyl resorcinol, 4-chlororesorchinol, 2,5-diamino-toluene, 1,3-diaminobenzene, 2,4-diaminophenoxyethanol HCl, 2-amino-hydroxyethylaminoanisole sulfate, 4-amino-2-hydroxytoluene, and mixtures thereof.

The oxidative dye precursor is preferably used in an amount comprised between 0.001% and 5%, preferably between 0.1% and 4% by weight based on the total weight of the composition.

The use of oxidative dye precursors and coupling agents in hair coloring formulation have been widely disclosed in the prior art and is well-known from the person skilled in the art. One may cite for example EP0946133A1, the content of which is incorporated by reference.

The alkaline phase comprises an alkaline agent, preferably chosen in the group consisting of ammonia hydroxide, ammonia carbonate, ethanolamine, potassium hydroxide, sodium borate, sodium carbonate, triethanolamine and mixtures thereof.

The alkaline agent is preferably used in an amount comprised between 1% and 10%, preferably between 3% and 9% by weight based on the total weight of the composition.

According to the invention, the coupling agent and the dye precursor in an alkaline medium form an oxidative hair dye in the presence of the oxidizing agent.

The oxidizing agent will supply the necessary oxygen gas to develop color molecules and create a change in hair color.

The oxidizing agent should be safe and effective for use in the compositions herein.

Preferably, the oxidizing agents suitable for use herein will be soluble in the compositions according to the present invention when in liquid form and/or in the form intended to be used.

Preferably, oxidizing agents suitable for use herein will be water-soluble. Suitable oxidizing agents for use herein are selected from inorganic peroxygen oxidizing agents, preformed organic peroxyacid oxidizing agents and organic peroxide oxidizing agents or mixtures thereof.

The oxidizing agent is preferably used in an amount comprised between 5 and 30%, preferably between 5 and 25% by weight based on the total weight of the composition.

Components commonly used in cosmetic compositions may be added into the hair coloring composition as defined in the present invention. One may cite for example, surfactants, cationic polymers, oily substances, silicone derivatives, free perfume, preservatives, ultraviolet absorbents, antioxidants, germicides, propellants, thickeners.

According to a particular embodiment, the hair coloring composition comprises one or more quaternary ammonium compounds, preferably chosen in the group consisting of cetyltrimonium chloride, stearyl trimonium chloride, benzalkonium chloride, behentrimonium chloride and mixture thereof to confer hair conditioner benefits.

Perfuming Composition

According to a particular embodiment, the consumer product is in the form of a perfuming composition comprising:

0.1 to 30%, preferably 0.1 to 20% of microcapsules as defined previously, 0 to 40%, preferably 3-40% of perfume, and 20-90, preferably 40-90% of ethanol, by weight based on the total weight of the perfuming composition.

The invention will now be further described by way of examples. It will be appreciated that the invention as claimed is not intended to be limited in any way by these examples.

EXAMPLES

TABLE 1

List of ingredients used in the examples

| Ingredients | Function |
|---|---|
| BTC[1] | Acyl chloride |
| mXDA[2] | Amino compound |
| L-lysine[3] | Amino compound |
| EDA[4] | Amino compound |
| Diethylene triamine[5] | Amino compound |
| Spermine dihydrate[6] | Amino compound |
| 3-Aminopropyltriethoxysilane[7] | Amino compound |
| Guanidine carbonate[8] | Amino compound |
| Cystamine hydrochloride[9] | Amino compound |
| Cystine ditertbutyl ester[10] | Amino compound |
| L-Arginine[11] | Amino compound |
| L-Glutamine[12] | Amino compound |
| L-Theorine[13] | Amino compound |
| Lactose[14] | Colloidal stabilizer |
| Zein[15] | Colloidal stabilizer |
| Gum arabic[16] | Colloidal stabilizer |
| Bovin Serum Albumin[17] | Colloidal stabilizer |
| New Rice[18] | Colloidal stabilizer |
| White Egg[19] | Colloidal stabilizer |
| Bio Pro 2E063[20] | Colloidal stabilizer |
| Bio Pur b-lactoglobulin[21] | Colloidal stabilizer |
| Sodium Caseinate[22] | Colloidal Stabilizer |
| Sodium bicarbonate[23] | Base |
| Sodium Carbonate[24] | Base |

TABLE 1-continued

List of ingredients used in the examples

| Ingredients | Function |
|---|---|
| Sodium Hydroxide[25] | Base |
| Triethanolamine[26] | Base |
| Polyisocyanate[27] | Monomer |

[1] benzene-1,3,5-tricarbonyl chloride; origin: Aldrich, Switzerland
[2] m-xylylene diamine; origin: Aldrich, Switzerland
[3] L-Lysine; origin: Aldrich, Switzerland
[4] Ethylene diamine; origin: Aldrich, Switzerland
[5] Diethylene triamine; origin: Aldrich, Switzerland
[6] Spermine dihydrate; origin: Aldrich, Switzerland
[7] 3-Aminopropyltriethoxysilane; origin: Alfa Aesar Switzerland
[8] Guanidine carbonate; origin: Aldrich, Switzerland
[9] Cystamine hydrochloride; origin: Aldrich, Switzerland
[10] Cystine ditertbutyl ester; origin: Aldrich, Switzerland
[11] L-Arginine; origin: Aldrich, Switzerland
[12] L-Glutamine; origin: Aldrich, Switzerland
[13] L-Theorine; origin: Aldrich, Switzerland
[14] Lactose; origin: Aldrich, Switzerland
[15] Zein; origin: Aldrich, Switzerland
[16] Acacia gum Superstab AA, origin: Nexira, France
[17] Bovin Serum Albumin; origin: Aldrich, Switzerland
[18] New Rice; origin: TER Chemicals Ingredients GMBH&Co
[19] White Egg
[20] Bio Pro 2E063; origin: Agropur Inc. USA
[21] Bio Pur b-lactoglobulin; origin: Danisco
[22] Sodium Caseinate; origin: Aldrich, Switzerland
[23] Sodium bicarbonate; origin: Aldrich, Switzerland
[24] Sodium Carbonate; origin: Aldrich, Switzerland
[25] Sodium Hydroxide; origin: Aldrich, Switzerland
[26] Triethanolamine; origin: Aldrich, Switzerland
[27] Takenate D-110N Perfume Oil Composition:

TABLE 2a

Perfume oil A composition

| Raw Materials | % in oil |
|---|---|
| 2,4-Dimethyl-3-cyclohexene-1-carbaldehyde | 3.30% |
| Allyl Heptanoate | 5.50% |
| Allyl amyl glycolate | 10.99% |
| Delta Damascone | 1.65% |
| Verdyl acetate | 20.30% |
| Hedione ®[1] | 4.95% |
| Iso E Super ®[2] | 16.49% |
| Ald. Hexylcinnamique | 9.89% |
| Ethyl-2-methylvalerate | 3.3% |
| Lilial | 21.98% |
| (3Z)-3-hexen-1-yl butyrate | 1.1% |
| Ambrox ®[3] | 0.55% |
| Total | 100% |

[1] Methyl dihydrojasmonate, Firmenich SA, Geneva, Switzerland
[2] 1-(octahydro-2,3,8,8-tetramethyl-2-naphtalenyl)-1-ethanone, International Flavors & Fragrances, USA
[3] (−)-(8R)-8,12-epoxy-13,14,15,16-tetranorlabdane, Firmenich SA, Geneva, Switzerland

TABLE 2b

Perfume oil B composition

| Ingredient | Parts |
|---|---|
| Ethyl 2-methyl-pentanoate | 3.2 |
| Eucalyptol | 7.8 |
| Aldehyde C10 | 0.75 |
| 2,4-Dimethyl-3-cyclohexene-1-carbaldehyde [1] | 0.75 |
| Citronellyl nitrile | 4.3 |
| Isobornyl acetate | 3.0 |
| Verdox [2] | 9.8 |
| Citronellyl acetate | 1.3 |

TABLE 2b-continued

| Perfume oil B composition | |
| --- | --- |
| Ingredient | Parts |
| 2-methylundecanal | 3.0 |
| Diphenyloxide | 0.8 |
| Aldehyde C12 | 1.3 |
| Dicyclopentadiene acetate | 9.85 |
| Ionone beta | 3.3 |
| Undecalactone gamma | 18.75 |
| Hexyl salicylate | 15.9 |
| Benzyl salicylate | 16.2 |

[1)] Origin: Firmenich SA, Geneva, Switzerland
[2)] Trademark from IFF; 2-tert-butyl-1-cyclohexyl acetate

Example 1

Preparation of Polyamide Microcapsules with Colloidal Stabilizer in Oil Phase Benzene-1,3,5-tricarbonyle chloride (1.77 g, Table 1) was dissolved in benzyl benzoate (5 g). Bovin Serum Albumin (0.95 g) was dispersed in benzyl benzoate (5 g) and was optionally maintained under stirring at 60° C. for one hour. Both solutions were mixed together, stirred at room temperature for 10 minutes, and then added to a perfume oil (25 g, Table 2a or Table 2b) at room temperature to form an oil phase. Oil phase was mixed with water (94.05 g), the latter comprising a first amino compound. Reaction mixture was stirred with an Ultra Turrax at 24,000 rpm for 30 s or 1 minute to afford an emulsion. A second amino compound (Table 3) was dissolved in water (5 g) and this solution was added dropwise to the emulsion. A solution of guanidine carbonate (30 wt % in water, 5 to 10 g) was optionally added to control pH value at about 8. The reaction mixture was stirred at 30° C. for 4 h to afford a white dispersion.

TABLE 3

| | Capsules compositions | | | |
| --- | --- | --- | --- | --- |
| Capsules | $1^{st}$ amino compound | (g) | $2^{nd}$ amino compoud | (g) |
| A1 | L-Lysine | 2.5 | EDA | 0.48 |
| A2 | L-Lysine | 2.5 | EDA | 0.36 |
| A3 | L-Lysine | 1.25 | EDA | 0.48 |
| A4 | L-Lysine | 2.5 | Diethylene triamine | 0.82 |
| A5 | L-Lysine | 2.5 | m-XDA | 1.08 |
| A6 | L-Lysine | 2.5 | Spermine dihydrate | 1.9 |
| A7 | L-Lysine | 2.5 | Guanidine carbonate | 0.72 |
| A8* | L-Lysine | 2.5 | EDA | 0.36 |
| A9* | L-Lysine | 2.5 | EDA | 0.24 |
| A10 | 3-aminopropyl triethoxysilane | 3.76 | EDA | 0.48 |
| A11 | 3-aminopropyl triethoxysilane | 3.76 | Diethylene triamine | 0.82 |
| A12 | L-Lysine | 2.5 | Cystamine dihydrochloride | 1.8 |
| A13 | L-Lysine | 2.5 | L-cystine bis(tert-butyl)ester dihydrochloride | 3.4 |
| A14 | 3-aminopropyl triethoxysilane | 3.76 | Cystamine dihydrochloride | 1.8 |
| B1** | L-Lysine | 2.5 | EDA | 0.24 |
| B2** | 3-aminopropyl triethoxysilane | 3.76 | Spermine dihydrate | 1.9 |
| B3** | 3-aminopropyl triethoxysilane | 3.76 | Ethylene diamine | 0.48 |

*prepared with 0.45 g of BSA
**protein and acyl chloride mixed at 60° C. for 1 h

Preparation of Capsules C(a)—Different Stabilizers

Capsules C were prepared in the presence of different proteins according the protocol described previously in the presence of L-Lysine (2.5 g) as a first amino compound and ethylene diamine (0.48 g) as a second amino compound.

TABLE 4

| | Capsules compositions | |
| --- | --- | --- |
| Capsules | Protein | Protein (g) |
| C1 | Gum Arabic | 0.95 |
| C2 | Sodium Caseinate | 0.95 |
| C3 | Zein | 0.95 |
| C4 | White Egg | 0.95 |
| C5 | Bio Pro LE 063-18-420 | 0.95 |
| C6 | Bio Pure b-lacto globulin | 0.95 |

Preparation of Capsules C(b)—Different Stabilizers

Capsules C(b) were prepared according to protocol used for capsules A with L-Lysine (2.5 g) as $1^{st}$ amino compound, cystamine dihydrochloride (1.8 g) as second amino compound, and different colloidal stabilizers.

TABLE 5

| | Capsules compositions | |
| --- | --- | --- |
| Capsules | Protein | Protein (g) |
| C7 | White Egg | 0.95 |
| C8 | Bio Pro LE 063-18-420 | 0.95 |
| C9 | Bio Pure b-lacto globulin | 0.95 |
| C10 | Gum Arabic | 0.95 |
| C11 | Sodium Caseinate | 0.95 |
| C12 | Zein | 0.95 |

Capsules D—Preparation of Capsules D with Different Quantities of Acyl Chloride BTC Capsules were prepared with BSA (0.95 g), L-Lysine and different quantities of 1,3,5-benzene tricarbonyl chloride (BTC) in perfume oil according to process of capsules A.

TABLE 6

| | Capsule D compositions | | |
| --- | --- | --- | --- |
| Capsules | BTC (g) | $2^{nd}$ amino compound | (g) |
| D1 | 1.77 | Ethylene diamine | 0.48 |
| D2 | 2.21 | Diethylene triamine | 1.03 |

Capsules E—Preparation of Capsules E with More than Two Amino Compounds.

Capsules E were prepared according to protocol used for capsules A, with sodium caseinate (2 g) as colloidal stabilizer with L-Lysine (2.5 g) as $1^{st}$ amino compound, mixtures of amines as $2^{nd}$ and $3^{rd}$ amino compound.

TABLE 7

| | Capsule E compositions | | | | |
|---|---|---|---|---|---|
| Capsules | 1st amino compound | (g) | 2nd amino compound | (g) | 3rd amino compound | (g) |
| E1 | L-Lysine | 2.5 | EDA | 0.12 | DETA | 0.21 |
| E2 | L-Lysine | 2.5 | EDA | 0.12 | Cystamine Dihydrochloride | 0.45 |
| E3 | L-Lysine | 2.5 | DETA | 0.21 | Cystamine Dihydrochloride | 0.45 |

Capsules F—Preparation of Capsules F with Two Amino Compounds Added Before Emulsion.

1,3,5-Benzene tricarbonyle chloride (1.77 g, Table 1) was dissolved in benzyl benzoate (5 g). sodium caseinate (0.95 to 2 g) was dispersed in benzyl benzoate (5 g) and was optionally maintained under stirring at 60° C. for 30 minutes. Both solutions were mixed together, and added to a perfume oil (25 g, Tables 2) at room temperature to form an oil phase. Oil phase was mixed with water (94.05 g), the latter comprising two amino compounds. Reaction mixture was stirred with an Ultra Turrax at 24,000 rpm for 30 s or 1 minute to afford an emulsion. The reaction mixture was stirred at 30° C. for 4 h to afford a white dispersion.

TABLE 8

| | Capsule F compositions | | | |
|---|---|---|---|---|
| Capsules | 1st amino compound | (g) | 2nd amino compound | (g) |
| F1 | L-Lysine | 0.73 | EDA | 0.24 |
| F2 | L-Lysine | 1.46 | EDA | 0.24 |
| F3 | L-Lysine | 2.5 | EDA | 0.21 |
| F4 | L-Lysine | 2.5 | EDA | 0.12 |
| F5 | L-Lysine | 0.73 | EDA | 0.21 |
| F6 | L-Lysine | 0.73 | EDA | 0.12 |

Example 2

Preparation of Polyamide Microcapsules with Colloidal Stabilizer in Water Phase Solution of 1,3,5-benzene tricarbonyle chloride (1.77 g) in benzyl benzoate (5 g) was added to the perfume oil (25 g, Tables 2) to form an oil phase. First amino compound was dissolved in an aqueous solution of gum arabic (95 g, 2 wt %). The solution was stirred for 15 minutes to form an aqueous phase. Oil phase was added to the aqueous phase and the reaction mixture was stirred with an Ultra Turrax at 24,000 rpm for 30 seconds to afford an emulsion. Second amino compound (Table 7) was dissolved in water (5 g) and this solution was added dropwise to the emulsion. The reaction mixture was stirred at 200 rpm with an anchor at 30° C. for 4 h to afford a white dispersion.

Capsules G—Preparation of Capsules G in the Presence of Gum Arabic

Capsules G were prepared according in the presence of an aqueous solution of gum Arabic at 2 wt % (95 g).

TABLE 9

| | Capsule G compositions | | | |
|---|---|---|---|---|
| Capsules | 1st amino compound | (g) | 2nd amino compoud | (g) |
| G1 | L-Lysine | 2.5 | m-XDA | 0.82 |
| G2 | L-Lysine | 2.5 | m-XDA | 0.54 |
| G3 | L-Lysine | 2.5 | Ethylene diamine | 0.82 |
| G4 | L-Lysine | 2.5 | Cystamine dihydrochloride | 1.80 |
| G5 | L-Lysine | 2.5 | Cystine bis(tert-butylester) dihydrochloride | 1.70 |

Preparation of Capsule H1 Comprising Other Colloidal Stabilizers and Mixtures of them in Water.

Solution of 1,3,5-benzene tricarbonyle chloride (1.77 g) in benzyl benzoate (5 g) was added to the perfume oil (25 g, Tables 2) to form an oil phase. L-Lysine (2.5 g) was dissolved in an aqueous solution of colloidal stabilizer(s) (95 g, 2 wt %). The solution was stirred for 15 minutes to form an aqueous phase. Oil phase was added to the aqueous phase and the reaction mixture was stirred with an Ultra Turrax at 24,000 rpm for 30 seconds to afford an emulsion. Ethylene diamine (0.24 to 0.48 g) was dissolved in water (5 g) and this solution was added dropwise to the emulsion. The reaction mixture was stirred at 200 rpm with an anchor at 30° C. for 4 h to afford a white dispersion.

TABLE 10

| | Capsule H compositions | |
|---|---|---|
| Capsules | Protein | Protein (g) |
| H1 | BSA | 0.95 |
| H2 | Sodium Caseinate | 0.95 |
| H3 | Sodium Caseinate | 2.0 |
| H4 | Sodium Caseinate 25%/Bio Pro LE 063-18-420 75% | 2.0 |

Example 3

Storage Stability in a Fabric Softener Composition

The storage stability of the capsules in fabric Softener was evaluated. Capsule dispersion (0.27 g) of the present invention (with encapsulated perfume oil B) was diluted in the fabric softener composition described in Table 11 (29.73 g). The softener was stored for up to one month at 37° C. The amount of perfume having leaked out of the capsules was then measured by solvent extraction and GC-FID analysis (Table 12).

TABLE 11

| Fabric Softener composition | |
|---|---|
| Product | Wt % |
| Stepantex VL 90A | 8.88 |
| Calcium Chloride Sol. 10% | 0.36 |
| Proxel GXL | 0.04 |
| Perfume | 1 |
| Water | 89.72 |
| TOTAL | 100 |

35

TABLE 12

Oil leakage of microcapsules in fabric softener composition

| Capsules | Leakage 3 days (%) | Leakage 30 days (%) |
|---|---|---|
| A2 | 9.5 | 20.8 |
| A3 | 8.6 | 20.4 |
| A8 | 12.9 | 23.1 |
| A9 | 9.1 | 23.4 |
| B1 | 8.2 | 19.7 |
| A13 | 10.8 | 16.6 |
| C11 | 13.4 | 22.8 |
| E1 | 10 | 19 |
| E2 | 12 | 20 |
| F1 | 6 | 21 |
| F2 | 6 | 19 |
| F3 | 32 | 54 |
| F4 | 55 | NM |
| F5 | 8 | 21 |
| F6 | 10 | 30 |
| G4 | 11 | 24.1 |
| H2 | 10 | 19 |
| H4 | 11 | 27 |

One can conclude that the microcapsules of the present invention show a satisfactory stability in challenging bases.

Example 4

Preparation of Polyamide Microcapsules with Colloidal Stabilizer in Oil Phase Benzene-1,3,5-tricarbonyle chloride (1.77 g, Table 1) and Takenate D110N (0.031 g, Table 1) was dissolved in benzyl benzoate (5 g). Sodium Casenate (2 g) was dispersed in benzyl benzoate (5 g) and was optionally maintained under stirring at 60° C. for one hour. Both solutions were mixed together, stirred at room temperature for 1 minute, and then added to a perfume oil (25 g, Table 2b) at room temperature to form an oil phase. Oil phase was mixed with water (94.05 g), the latter comprising a first amino compound. Reaction mixture was stirred with an Ultra Turrax at 24,000 rpm for 30 s or 10 minutes to afford an emulsion. A second amino compound (Table 13) was dissolved in water (5 g) and this solution was added dropwise to the emulsion. A solution of guanidine carbonate (30 wt % in water, 5 to 10 g) was optionally added to control pH value at about 8. The reaction mixture was stirred at 30° C. for 4 h to afford a white dispersion.

TABLE 13

Capsules compositions

| Capsules | 1st amino compound | (g) | 2nd amino compoud | (g) | STABILITY 3 days/1 month/ 2 months softener base 38° C. |
|---|---|---|---|---|---|
| I1 | L-Lysine | 2.5 | EDA | 0.24 | 6-15-25% |
| I2 | L-Lysine | 2.5 | EDA | 0.24 | 7-18-29% |

Capsules J—Preparation of Capsules J with Different Quantity of Caseinate Dispersed in Oil Phase.

1,3,5-Benzene tricarbonyle chloride (1.77 g, Table 1) was dissolved in benzyl benzoate (5 g). sodium caseinate (0.95 to 2 g) was dispersed in benzyl benzoate (5 g) and was optionally maintained under stirring at 60° C. for 30 minutes. Both solutions were mixed together, and added to perfume oil (25 g, Table 2b) at room temperature to form an oil phase. Oil phase was mixed with water (94.05 g), the latter comprising a amino compound. Reaction mixture was stirred with an Ultra Turrax at 24,000 rpm for 30 s or 1 minute to afford an emulsion. A second amino compound (Table 14) was dissolved in water (5 g) and this solution was added dropwise to the emulsion. A solution of guanidine carbonate (30 wt % in water, 5 to 10 g) was optionally added to control pH value at about 8. The reaction mixture was stirred at 30° C. for 4 h to afford a white dispersion.

TABLE 14

Capsules compositions

| Capsules | 1st amino compound | (g) | Casienate QTy g | 2nd amino compoud | (g) | Stability 3 days/1 month(*) |
|---|---|---|---|---|---|---|
| J1 | L-Lysine | 2.5 | 0.95 | EDA | 0.24 | 18/39% |
| J2 | L-Lysine | 2.5 | 1.25 | EDA | 0.24 | 12/27% |
| J3 | L-Lysine | 2.5 | 1.5 | EDA | 0.24 | 16/37 |
| J4 | L-Lysine | 2.5 | 1.75 | EDA | 0.24 | 19/43 |
| J5 | L-Lysine | 2.5 | 2 | EDA | 0.24 | 13/23% |

(*)stability assessed in a fabric softener composition (see table 11)

Example 5

Polyamide Capsules with a Cationic Coating

Process for preparing microcapsules S corresponds to the process for preparing microcapsules J5 except that an additional step of adding a cationic copolymer (0.8 wt % based on the slurry), namely acrylamidopropyltrimonium chloride/acrylamide copolymer (Salcare® SC60, origin BASF) (3 wt % in water) has been carried out at the end of the process.

Example 6

Polyamide Capsules with a Mixture of Acyl Chloride

Capsules E: Preparation of Capsules K with a Mixture of Acyl Chloride and Caseinate in the Oil Phase Capsules K were prepared in the presence of caseinate and diamines according the protocol used to prepare capsules A in the presence of L-Lysine (2.5 g) as first amino compound A and ethylene diamine (0.48 g or 0.24 g) as second amino compound B.

| Capsules | Acyl chloride | Molarity OCl mmol |
|---|---|---|
| K1 | Isopthaloyl chloride/BTC | 10/10 |
| K2 | Isopthaloyl chloride/BTC | 5/15 |

Example 7

Olfactive Performance of the Polyamide Microcapsules

The slurry of microcapsules is diluted in softener base at 0.11% of free perfume (see composition in Table 11). The sample is agitated in the turbulat at 41 rpm for 5 minutes. To get closer to the dilution in the washing machine during the rinsing cycle, the sample is diluted at 2% in deionized water. 1 mL of this solution is withdrawn and deposited on the blotter. The sample is let drying 24 h at RT before processing to the evaluation before and after rubbing.

Evaluation scale: (fragrance intensity): 1=no fragrance odor; 2=just detectable; 3=weak; 4=moderate; 5=slightly strong; 6=intense; 7=very intense.

TABLE 15

| Sensory analysis result of microcapsules in fabric softener | |
|---|---|
| Capsule | Score/7 fresh |
| A1 | 5.5 |
| C2 | 4.75 |

Capsules show a good rubbing effect, confirming the efficient encapsulation.

Example 8

Shell Composition by Elemental Analysis

Shell Extraction

The slurry is washed in a separating funnel with DI water 3 times. The washed microcapsules are centrifuged for 20 minutes at 5000 RPM. The microcapsules are removed and dried at RT for 2 days. The dried shells have been grinded and splitted in erlenmeyers and the perfume extracted with Ethyl Acetate (concentration 5 wt %) and magnetic stirring (1 h; 500 rpm). The shells were filtered under vacuum with a sintered glass funnel. Extraction was done five times. Shell was collected into a crystallizer and dried at 50° C. under vacuum and then crushed with IKA Tube Mill (5 min; 20100 rpm) to get a white powder. Shells were stirred in water for 24 h and recovered by filtration. Shell was dried and crushed again by IKA Tube Mill (5 min; 20100 rpm). Shells were extracted with ethyl acetate and magnetic stirring (1 h; 600 rpm), and filtered under vacuum with a sintered glass funnel. Process was repeated five times. Shells were collected into a crystallizer and dried at 50° C. under vacuum. Resulting product was crushed (IKA Tube Mill, 5 min; 20100 rpm).

Determination of Shell Composition by Elemental Analysis

Elemental analysis of the different shell ingredients was calculated using ChemDraw® Professional (version: 17.1.0.105, origin: PerkinElmer Informatics, Inc., USA). Composition was estimated by calculation based on the component compositions reported in Table 17.

TABLE 17

| | | | | | | Estimation of shell composition by wt % | | | | | |
|---|---|---|---|---|---|---|---|---|---|---|---|
| Capsules | % C | % H | % N | % O | % S | % Total | % BTC | % Lysine | % EDA | % XDA | % Stabilizer |
| G1 | 47.4 | 6.0 | 8.5 | 26.3 | 0.0 | 88.2 | 39.0 | 36.0 | | 13.0 | 12.0 |
| G2 | 44.6 | 5.9 | 8.2 | 25.7 | 0.0 | 84.4 | 28.0 | 38.0 | | 12.0 | 12.0 |
| F5 | 51.4 | 6.7 | 14.3 | 24.9 | 0.6 | 97.9 | 21.0 | 0.0 | 9.4 | | 69.6 |
| F6 | 15.2 | 6.8 | 14.3 | 25.2 | 0.6 | 98.1 | 20.8 | 0.0 | 9.2 | | 70.0 |
| H2 | 50.9 | 6.6 | 13.1 | 26.5 | 0.4 | 97.5 | 29.0 | 45.0 | 3.0 | | 23.0 |
| H3 | 49.2 | 6.8 | 12.4 | 25.7 | 0.0 | 94.1 | 29.0 | 41.0 | 3.0 | | 27.0 |

Results showed that shell comprised the reaction product of 1,3,5-benzene tricarbonyl chloride with both amino compounds. Analyses confirmed the presence of cystamine in the shell with Lysine.

Results showed that shell comprises more than 50 mol % of the reaction product of 1,3,5-benzene tricarbonyl chloride with amino compounds. Analyses confirmed the presence of ethylene diamine in the shell with Lysine when the latter is used in the formulation. Presence of colloidal stabilizer was also observed in capsules E1 and E2 (Gum Arabic).

Example 9

Spray-Dried Microcapsules Preparation

Emulsions A-E having the following ingredients are prepared.

TABLE 18

| Composition of Emulsions A-E and composition of granulated powder A-E after spray-drying | | | | | |
|---|---|---|---|---|---|
| Ingredients | Emulsion A | Emulsion B | Emulsion C | Emulsion D | Emulsion E |
| Modified starch [1] | 2.6% | 2.6% | 2.6% | 12.5% | 2% |
| Maltodextrin [2] | 26.8% | 22.8% | 19.3% | 0% | 19.1% |
| Maltose [3] | 0% | 0% | 0% | 7.9% | 0% |
| Citric Acid | 0% | 0% | 0% | 1% | 0% |
| Tripotassium Citrate | 0% | 0% | 0% | 1.9% | 0% |
| Microcapsules A-J | 12.0% | 24% | 37.0% | 8.9% | 56.2% |
| Silica [4] | 1.1% | 1.1% | 1.1% | 0% | 0% |
| Free Perfume C [5] | 0% | 0% | 0% | 11% | 0% |
| Water | 57.6% | 49.6% | 40.1% | 56.9% | 22.7% |

TABLE 18-continued

| Composition of Emulsions A-E and composition of granulated powder A-E after spray-drying | | | | | |
| --- | --- | --- | --- | --- | --- |
| | Granule A | Granule B | Granule C | Granule D | Granule E |
| Modified starch [1] | 7.5% | 7.4% | 7.2% | 31.6% | 4.9% |
| Maltodextrin [2] | 77.4% | 65.5% | 53.8% | 0% | 44.7% |
| Maltose | 0% | 0% | 0% | 20.9% | |
| Citric Acid | 0% | 0% | 0% | 2.6% | 0% |
| Tripotassium citrate | 0% | 0% | 0% | 4.9% | 0% |
| Encapsulated perfume C | 0% | 0% | 0% | 28.1% | 0% |
| Microcapsules I-L | 12.% | 24.1% | 36.1% | 9.8% | 48.4% |
| Silica | 3.0 | 3.0% | 2.9% | 2.0% | 2% |
| Fragrance loading in powder after spray-drying | 10.1% | 20.1% | 30% | 35.8% | 40.2% |

[1] CapsulTM, Ingredion
[2] Maltodextrin 10DE origin: Roquette
[3] Maltose, Lehmann & Voss
[4] Silica, Evonik
[5] see table 19

TABLE 19

| Composition of Perfume C | |
| --- | --- |
| Component | % |
| ACETATE DE 4-(1,1-DIMETHYLETHYL)-1-CYCLOHEXYLE [1] | 14.50 |
| LINALOL BJ | 10.50 |
| LILIAL ® [2] | 10.00 |
| ISO E SUPER [3] | 10.00 |
| C1TRONELLYL NITRILE | 9.00 |
| DIPHENYLOXYDE | 6.50 |
| ISOBORNYL ACETATE | 6.00 |
| BETA IONONE | 6.00 |
| TRICYCLO[5.2.1.0-2,6-]DEC-3-EN-8-YL ACETATE (A) + TRICYCLO[5.2.1,0~2,6~]DEC-4-EN-8-YL ACETATE (B) [4] | 5.50 |
| ETHER MT | 4.00 |
| HEDIONE ® [5] | 4.00 |
| GERANIOL 60 | 3.00 |
| CITRAL | 2.50 |
| ALDEHYDE C 10 | 2.50 |
| ALLYL HEPTANOATE | 2.50 |
| ETHYL METHYL-2-BUTYRATE | 1.50 |
| GERANYL ACETATE | 1.00 |
| 2,4-DIMETHYL-3-CYCLOHEXENE-1-CARBALDEHYDE [6] | 1.00 |

[1] Firmenich SA, Switzerland
[2] 3-(4-tert-butylphenyl)-2-methylpropanal, Givaudan SA, Vernier, Switzerland
[3] 1-(octahydro-2,3,8,8-tetramethyl-2-naphtalenyl)-1-ethanone, International Flavors & Fragrances, USA
[4] Firmenich SA, Switzerland
[5] Methyl dihydrojasmonate, Firmenich SA, Switzerland
[6] Firmenich SA, Switzerland Components for the polymeric matrix (Maltodextrin and Capsul™, or Capsul™, citric acid and tripotassium citrate) are added in water at 45-50° C. until complete dissolution.

For emulsion D, free perfume C is added to the aqueous phase.

Microcapsules slurry is added to the obtained mixture. Then, the resulting mixture is then mixed gently at 25° C. (room temperature).

Granulated powder A-E are prepared by spray-drying Emulsion A-E using a Sodeva Spray Dryer (Origin France), with an air inlet temperature set to 215° C. and a throughput set to 500 ml per hour. The air outlet temperature is of 105° C. The emulsion before atomization is at ambient temperature.

Example 10

Liquid Scent Booster Composition

A sufficient amount of microcapsule slurry A-J is weighed and mixed in a liquid scent booster (Table 20) to add the equivalent of 0.200 perfume.

TABLE 20

| Liquid scent booster composition | | | | | | |
| --- | --- | --- | --- | --- | --- | --- |
| | Amount (% wt) | | | | | |
| Ingredients | 1 | 2 | 3 | 4 | 5 | 6 |
| Water | 71.20% | 89.5% | 78.8% | 79.4% | 70% | 70% |
| Propylene glycol | 20.30% | — | — | — | 20% | 20% |
| Polyethylene glycol ethers of decyl alcohol[1] | 4.00% | 6% | | | | |
| Polyethylene glycol ether of Lauryl Alcohol[2] | | | | | 4.00% | 4.00% |
| alkyl polyglucoside C8-C10[3] | | | 8.30% | 7.7% | | |
| Deceth-3[1] | 1.50% | | | | | |
| Lauryl lactate | | | | 1% | | |

TABLE 20-continued

| Liquid scent booster composition | | | | | | |
|---|---|---|---|---|---|---|
| | Amount (% wt) | | | | | |
| Ingredients | 1 | 2 | 3 | 4 | 5 | 6 |
| Lauric acid | | 1.5% | 1.60% | | | |
| Glyceryl Caprylate | | | | | 3.00% | 3.00% |
| Fragrance | 3.00% | 3.0% | 3.00% | 3.00% | 3.00% | 0% |

[1]Deceth-8; trademark and origin: KLK Oleo
[2]Laureth-9; ; trademark and origin
[3]Plantacare 2000UP; trademark and origin: BASF Different ringing gel compositions are prepared (compositions 1-6) according to the following protocol.

In a first step, the aqueous phase (water), the solvent (propylene glycol) if present and surfactants are mixed together at room temperature under agitation with magnetic stirrer at 300 rpm for 5 min.

In a second step, the linker is dissolved in the hydrophobic active ingredient (fragrance) at room temperature under agitation with magnetic stirrer at 300 rpm. The resulting mixture is mixed for 5 min.

Then, the aqueous phase and the oil phase are mixed together at room temperature for 5 min leading to the formation of a transparent or opalescent ringing gel.

Example 11

Liquid Detergent Composition

A sufficient amount of microcapsule slurry A-J is weighed and mixed in a liquid detergent (Table 21) to add the equivalent of 0.2% perfume.

TABLE 21

| Liquid detergent composition | |
|---|---|
| Ingredients | Concentration [wt %] |
| Sodium $C_{14-17}$ Alkyl Sec Sulfonate[1] | 7 |
| Fatty acids, $C_{12-18}$ and $C_{18}$-unsaturated[2] | 7.5 |
| $C_{12/14}$ fatty alcohol polyglycol ether with 7 mol EO[3] | 17 |
| Triethanolamine | 7.5 |
| Propylene Glycol | 11 |
| Citric acid | 6.5 |
| Potassium Hydroxyde | 9.5 |
| Properase L[4] | 0.2 |
| Puradax EG L[4] | 0.2 |
| Purastar ST L[4] | 0.2 |
| Acrylates/Steareth-20 Methacrylate structuring Crosspolymer[5] | 6 |
| Deionized Water | 27.4 |

[1]Hostapur SAS 60; Origin: Clariant
[2]Edenor K 12-18; Origin: Cognis
[3]Genapol LA 070; Origin: Clariant
[4]Origin: Genencor International
[5]Aculyn 88; Origin: Dow Chemical

Example 12

Powder Detergent Composition

A sufficient amount of granules A-E is weighed and mixed in a powder detergent composition (Table 22) to add the equivalent of 0.2% perfume.

TABLE 22

| Powder detergent composition | |
|---|---|
| Ingredients | Part |
| Anionic (Linear Alkyl Benzene Sulphonates) | 20% |
| Nonionics (Alcohol Ethoxylates (5-9 ethylene oxide) | 6% |
| Builders (zeolites, sodium carbonate) | 25% |
| Silicates | 6% |
| Sodium Sulphate | 35% |
| Others (Enzymes, Polymers, Bleach) | 7.5% |
| Spray-dried granule powder A-E | 0.5% |

Example 13

Concentrated all Purpose Cleaner Composition

A sufficient amount of microcapsule slurry A-J is weighed and mixed in a concentrated all-purpose cleaner composition (Table 23) to add the equivalent of 0.2% perfume.

TABLE 23

| concentrated all-purpose cleaner composition | | |
|---|---|---|
| Ingredients | Amount (% wt) | Function |
| Ethoxylated Alcohol (C9-C11, 8EO) [1] | 20 | Non-ionic surfactant |
| Sodium Dodecyl Benzene Sulfonate [2] | 16 | Anionic surfactant |
| Sodium Cumene Sulfonate [3] | 8 | Hydrotrope |
| Methyl chloro isothiazolinone Methyl isothiazolinone 3.3:1 [4] | 0.8% | preservative |
| Water | 55.9 | solvent |

[1] Neodol 91-8 ®; trademark and origin: Shell Chemical
[2] Biosoft D-40 ®; trademark and origin: Stepan Company
[3] Stepanate SCS ®; trademark and origin: Stepan Company
[4] Kathon CG ®; trademark and origin: Dow Chemical Company
All ingredients are mixed together and then the mixture was diluted with water to 100%.

Example 14

Solid Scent Booster Composition

The following compositions are prepared.

TABLE 24

Salt-based solid scent booster compositions

| Ingredients | Part |
|---|---|
| Sodium chloride | 95 |
| Spray-dried granule powder A-E | 5 |

TABLE 25

Urea-based solid scent booster compositions

| Ingredients | Part |
|---|---|
| Urea (beads) | 86 |
| Spray-dried granule powder A-E | 8 |
| Bentonite | 3 |
| Perfume | 3 |

Example 15

Shampoo Composition

A sufficient amount of microcapsule slurry A-J is weighed and mixed in a shampoo composition (Table 26) to add the equivalent of 0.2% perfume.

TABLE 26

Shampoo composition

| | Ingredients | Concentration [wt %] |
|---|---|---|
| A | Water deionized | 44.4 |
| | Polyquaternium-10 [1] | 0.3 |
| | Glycerin 85% [2] | 1 |
| | DMDM Hydantoin [3] | 0.2 |
| B | Sodium Laureth Sulfate [4] | 28 |
| | Cocamidopropyl Betaine [5] | 3.2 |
| | Disodium Cocoamphodiacetate [6] | 4 |
| | Ethoxy (20) Stearyl Alcohol [6] | 1 |
| C | Sodium Laureth Sulfate [4] | 3 |
| | Glyceryl Laureate | 0.2 |
| D | Water deionized | 1 |
| | Sodium Methylparaben [8] | 0.1 |
| E | Sodium Chloride 10% aqueous sol. | 15 |
| | Citric acid 10% aqueous sol. till pH 5.5-6 | q.s. |
| | Perfume | 0.5 |
| | TOTAL: | 100 |

[1] Ucare Polymer JR-400, Noveon
[2] Schweizerhall
[3] Glydant, Lonza
[4] Texapon NSO IS, Cognis
[5] Tego Betain F 50, Evonik
[6] Amphotensid GB 2009, Zschimmer & Schwarz
[7] Monomuls 90 L-12, Gruenau
[8] Nipagin Monosodium, NIPA Polyquaternium-10 is dispersed in water. The remaining ingredients of phase A are mixed separately by addition of one after the other while mixing well after each adjunction. Then this pre-mix is added to the Polyquaternium-10 dispersion and was mixed for 5 min. Then Phase B and the premixed Phase C (heat to melt Monomuls 90 L-12 in Texapon NSO IS) are added. The mixture is mixed well. Then, Phase D and Phase E are added while agitating. The pH was adjusted with citric acid solution till pH: 5.5-6.0.

Example 16

Shampoo Composition

A sufficient amount of microcapsule slurry A-J is weighed and mixed in a shampoo composition (Table 27) to add the equivalent of 0.2% perfume.

TABLE 27

Shampoo composition

| | Ingredients | Concentration [wt %] |
|---|---|---|
| A | Water deionized | 45.97 |
| | Tetrasodium EDTA [1] | 0.05 |
| | Guar Hydroxypropyltrimonium Chloride [2] | 0.05 |
| | Polyquaterium-10 [3] | 0.075 |
| B | NaOH 10% aqueous sol. | 0.3 |
| C | Ammonium Lauryl Sulfate [4] | 34 |
| | Ammonium Laureth Sulfate [5] | 9.25 |
| | Cocamidopropyl Betaine [6] | 2 |
| | Dimethicone (&) C12-13 Pareth-4 (&) C12-13 Pareth-23 (&) Salicylic Acid [7] | 2.5 |
| D | Cetyl Alcohol [8] | 1.2 |
| | Cocamide MEA [9] | 1.5 |
| | Glycol Distearate [10] | 2 |
| E | Methylchloroisothiazolinone & Methyl-isothiazolinone [11] | 0.1 |
| | D-Panthenol 75% [12] | 0.1 |
| | Water deionized | 0.3 |
| F | Sodium Chloride 25% aqueous sol. | 0.6 |
| | TOTAL: | 100 |

[1] EDTA B Powder, BASF
[2] Jaguar C14 S, Rhodia
[3] Ucare Polymer JR-400, Noveon
[4] Sulfetal LA B-E, Zschimmer & Schwarz
[5] Zetesol LA, Zschimmer & Schwarz
[6] Tego Betain F 50, Evonik
[7] Xiameter MEM-1691, Dow Corning
[8] Lanette 16, BASF
[9] Comperlan 100, Cognis
[10] Cutina AGS, Cognis
[11] Kathon CG, Rohm & Haas
[12] D-Panthenol, Roche A premix comprising Guar Hydroxypropyltrimonium Chloride and Polyquaternium-10 are added to water and Tetrasodium EDTA while mixing. When the mixture is homogeneous, NaOH is added. Then, Phase C ingredients are added and the mixture was heat to 75° C. Phase D ingredients are added and mixed till homogeneous. The heating is stopped and temperature of the mixture is decreased to RT. At 45° C., ingredients of Phase E while mixing final viscosity is adjusted with 25% NaCl solution and pH of 5.5-6 is adjusted with 10% NaOH solution.

Example 17

Rinse-Off Hair Composition

A sufficient amount of microcapsule slurry A-J is weighed and mixed in a rinse-off composition 10 (Table 28) to add the equivalent of 0.2% perfume.

TABLE 28

| | | Concentration [wt %] |
|---|---|---|
| | rinse-off composition | |
| | Ingredients | |
| A | Water deionized | 81.8 |
| | Behentrimonium Chloride [1] | 2.5 |
| | Hydroxyethylcellulose [2] | 1.5 |
| B | Cetearyl Alcohol [3] | 4 |
| | Glyceryl Stearate (and) PEG-100 Stearate [4] | 2 |
| | Behentrimonium Methosulfate (and) Cetyl alcohol (and) Butylene Glycol [5] | 4 |
| | Ethoxy (20) Stearyl Alcohol [6] | 1 |
| C | Amodimethicone (and) Trideceth-12 (and) Cetrimonium Chloride [7] | 3 |
| | Chlorhexidine Digluconate [8] 20% aqueous solution | 0.2 |
| D | Citric acid 10% aqueous sol. till pH 3.5-4 | q.s. |
| | TOTAL: | 100 |

[1] Genamin KDMP, Clariant
[2] Tylose H10 Y G4, Shin Etsu
[3] Lanette O, BASF
[4] Arlacel 165, Croda
[5] Incroquat Behenyl TMS-50-PA-(MH), Croda
[6] Brij S20, Croda
[7] Xiameter MEM-949, Dow Corning
[8] Alfa Aesar Ingredients of Phase A are mixed until an uniform mixture was obtained. Tylose is allowed to completely dissolve. Then the mixture is heated up to 70-75° C. Ingredients of Phase B are combined and melted at 70-75° C. Then ingredients of Phase B are added to Phase A with good agitation and the mixing is continued until cooled down to 60° C. Then, ingredients of Phase C are added while agitating and keeping mixing until the mixture cooled down to 40° C. The pH is adjusted with citric acid solution till pH: 3.5-4.0.

Example 18

Antiperspirant Spray Anhydrous Composition

A sufficient amount of microcapsule slurry A-J is weighed and mixed in an antiperspirant spray anhydrous composition (Table 29) to add the equivalent of 0.2% perfume.

TABLE 29

| | |
|---|---|
| antiperspirant spray anhydrous composition | |
| Ingredient | Amount (wt %) |
| Cyclomethicone[1] | 53.51 |
| Isopropyl miristate | 9.04 |
| Silica[2] | 1.03 |
| Quaternium-18-Hectorite[3] | 3.36 |
| Aluminium Chlorohydrate[4] | 33.06 |

[1] Dow Corning ® 345 Fluid; trademark and origin: Dow Corning
[2] Aerosil ® 200; trademark and origin: Evonik
[3] Bentone ® 38; trademark and origin: Elementis Specialities
[4] Micro Dry Ultrafine; origin: Reheis Using a high speed stirrer, Silica and Quaternium-18-Hectorite are added to the Isopropyl miristate and Cyclomethicone mixture. Once completely swollen, Aluminium Chlorohydrate is added portion wise under stirring until the mixture was homogeneous and without lumps. The aerosol cans are filled with 25% Suspension of the suspension and 75% of Propane/Butane (2.5 bar).

Example 19

Antiperspirant Spray Emulsion Composition

A sufficient amount of microcapsule slurry A-J is weighed and mixed in antiperspirant spray emulsion composition (Table 30) to add the equivalent of 0.2% perfume.

TABLE 30

| | |
|---|---|
| antiperspirant spray emulsion composition | |
| Ingredient | Amount (wt %) |
| Polysorbate 65[1] (Part A) | 0.95 |
| Polyglyceryl-2 dipolyhydroxystearate[2] (Part A) | 1.05 |
| Cetyl PEG/PPG-10/1 Dimethicone[3] (Part A) | 2.75 |
| Cyclomethicone[4] (Part A) | 16.4 |
| Isopropylisostearate[5] (Part A) | 4.5 |
| Phenoxyethanol[6] (Part A) | 0.5 |
| Ethylhexylglycerin[7] (Part A) | 0.2 |
| C12-15 Alkyl Benzoate[8] (Part A) | 5.65 |
| Silica Silylate[9] (Part A) | 0.1 |
| Sodium Methylparaben[10] (Part B) | 0.1 |
| Aluminium Chlorohydrate[11] (Part B) | 20 |
| Water (Part B) | 44.47 |
| Fragrance (Part C) | 3.33 |

[1] Tween 65; trademark and origin: CRODA
[2] Dehymuls PGPH; trademark and origin: BASF
[3] Abil EM-90; trademark and origin: BASF
[4] Dow Corning 345 fluid; trademark and origin: Dow Corning
[5] Crodamol ipis; trademark and origin: CRODA
[6] Phenoxyethanol; trademark and origin: LANXESS
[7] Sensiva sc 50; trademark and origin: KRAFT
[8] Tegosoft TN; trademark and origin: Evonik
[9] Aerosil R 812; trademark and origin: Evonik
[10] Nipagin mna; trademark and origin: CLARIANT
[11] Locron L; trademark and origin: CLARIANT The ingredients of Part A and Part B are weighted separately. Ingredients of Part A are heated up to 60° C. and ingredients of Part B are heated to 55° C. Ingredients of Part B are poured small parts while continuous stirring into A. Mixture were stirred well until the room temperature was reached. Then, ingredients of part C are added. The emulsion is mixed and is introduced into the aerosol cans. The propellant is crimped and added.

Aerosol filling: 30% Emulsion: 70% Propane/Butane 2.5 bar

Example 20

Deodorant Spray Composition

A sufficient amount of microcapsule slurry A-J is weighed and mixed in antiperspirant deodorant spray composition (Table 31) to add the equivalent of 0.2% perfume.

TABLE 31

| | |
|---|---|
| deodorant spray composition | |
| Ingredient | Amount (wt %) |
| Ethanol 95% | 90.65 |
| Triclosan[1] | 0.26 |
| Isopropyl miristate | 9.09 |

[1] Irgasan ® DP 300; trademark and origin: BASF

All the ingredients according to the sequence of the Table 24 are mixed and dissolved. Then the aerosol cans are filled, crimp and the propellant is added (Aerosol filling: 40% active solution 60% Propane/Butane 2.5 bar).

Example 21

Antiperspirant Roll-on Emulsion Composition

A sufficient amount of microcapsule slurry A-J is weighed and mixed in antiperspirant roll-on emulsion composition (Table 32) to add the equivalent of 0.2% perfume.

TABLE 32

| antiperspirant roll-on emulsion composition | |
| --- | --- |
| Ingredient | Amount (wt %) |
| Steareth-2[1] (Part A) | 3.25 |
| Steareth-2[2] (Part A) | 0.75 |
| PPG-15 Stearyl Ether[3] (Part A) | 4 |
| WATER deionised (Part B) | 51 |
| Aluminum Chlorohydrate 50% aqueous solution[4] (Part C) | 40 |
| Fragrance (Part D) | 1 |

[1]BRIJ 72; origin: ICI
[2]BRIJ 721; origin: ICI
[3]ARLAMOL E; origin: UNIQEMA-CRODA
[4]LOCRONL; origin: CLARIAN Part A and B are heated separately to 75° C.; Part A is added to part B under stirring and the mixture is homogenized for 10 minutes. Then, the mixture is cooled down under stirring; and part C is slowly added when the mixture reached 45° C. and part D when the mixture reached at 35° C. while stirring. Then the mixture is cooled down to RT.

Example 22

Antiperspirant Roll-on Composition

A sufficient amount of microcapsule slurry A-J is weighed and mixed in antiperspirant roll-on composition (Table 33) to add the equivalent of 0.2% perfume.

TABLE 33

| antiperspirant roll-on composition | |
| --- | --- |
| Ingredient | QUANTITY |
| Water (Part A) | 45 |
| Aluminum Chlorohydrate 50% aqueous solution[1] (Part B) | 20 |
| Alcohol Denat. (Ethanol 96%) (Part B) | 30 |
| Ceteareth-12[2] (Part C) | 2 |
| Ceteareth-30[3] (Part C) | 2 |
| Fragrance (Part D) | 1 |

[1]LOCRON L; origin: CLARIANT
[2]EUMULGIN B-1; origin: BASF
[3]EUMULGIN B-3; origin: BASF The ingredients of part B are mixed in the vessel then ingredient of part A is added. Then dissolved part C in part A and B. With perfume, 1 part of Cremophor RH40 for 1 part of perfume is added while mixing well

Example 23

Antiperspirant Roll-on Composition

A sufficient amount of microcapsule slurry A-J is weighed and mixed in antiperspirant roll-on emulsion composition (Table 34) to add the equivalent of 0.2% perfume.

TABLE 34

| antiperspirant roll-on emulsion composition | |
| --- | --- |
| Ingredient | Amount (wt %) |
| Water (Part A) | 50.51 |
| Hydroxyethylcellulose[1] (Part A) | 0.71 |
| Ethanol 95% (Part B) | 40.40 |
| 1,2-Propylene Glycol (Part B) | 5.05 |
| Triclosan[2] (Part B) | 0.30 |
| PEG-40 Hydrogenated castor oil[3] (Part C) | 3.03 |

[1]Natrosol ® 250 H; trademark and origin: Ashland
[2]Irgasan ® DP 300; trademark and origin: BASF
[3]Cremophor ® RH 40; trademark and origin: BASF Part A is prepared by sprinkling little by little the Hydroxyethylcellulose in the water whilst rapidly stirring with the turbine. Stirring is continued until the Hydroxyethylcellulose is entirely swollen and giving a limpid gel. Then, Part B is poured little by little in Part A whilst continuing stirring until the whole is homogeneous. Part C is added.

Example 24

Deodorant Pump without Alcohol Formulation

A sufficient amount of microcapsule slurry A-J is weighed and mixed in the following composition (Table 35) to add the equivalent of 0.2% perfume.

TABLE 35

| deodorant composition | |
| --- | --- |
| Ingredients | Amount (wt %) |
| C12-15 Alkyl Lactate[1] | 5 |
| Dimethicone[2] | 91.6 |
| Cetyl Lactate[3] | 1 |
| Octyldodecanol[4] | 0.8 |
| Triclosan[5] | 0.1 |
| PERFUME | 1.5 |

[1]Ceraphyl 41; trademark and origin ASHLAND
[2]DOW CORNING 200 FLUID 0.65 cs; trademark and origin DOW CORNING CORPORATION
[3]Ceraphyl 28; trademark and origin ASHLAND
[4]Eutanol G; trademark and origin BASF
[5]Irgasan ® DP 300; trademark and origin: BASF All the ingredients of Table 28 are mixed according to the sequence of the table and the mixture is heated slightly to dissolve the Cetyl Lactate.

Example 25

Deodorant Pump with Alcohol Formulation

A sufficient amount of microcapsule slurry A-J is weighed and mixed in the following composition (Table 36) to add the equivalent of 0.2% perfume.

TABLE 36

| deodorant composition | |
| --- | --- |
| Ingredients | Amount (wt %) |
| Ethyl Alcohol (Part A) | 60 |
| PEG-6 Caprylic/Capric Glycerides[(1)] (Part A) | 2 |

TABLE 36-continued

| deodorant composition | |
|---|---|
| Ingredients | Amount (wt %) |
| Water (Part A) | 35.6 |
| PEG-40 Hydrogenated Castor Oil[2] (Part B) | 0.4 |
| PERFUME (Part B) | 2 |

[1]Softigen 767; trademark and origin CRODA
[2]Cremophor ® RH 40; trademark and origin: BASF Ingredients from Part B are mixed together. Ingredients of Part A are dissolved according to the sequence of the Table and are poured into part B.

Example 26

Talc Formulation

A sufficient amount of granules A-E is weighed and mixed in introduced in a standard talc base: 100% talc, very slight characteristic odor, white powder, origin: LUZENAC to add the equivalent of 0.2% perfume.

Example 27

Shower-Gel Reference

A sufficient amount of microcapsule slurry A-J is weighed and mixed in the following composition (Table 37) to add the equivalent of a 0.2% perfume.

TABLE 37

| shower gel composition | | |
|---|---|---|
| Ingredients | Amount (% wt) | Function |
| WATER deionised | 49.350 | Solvent |
| Tetrasodium EDTA [1] | 0.050 | Chelating agent |
| Acrylates Copolymer[2] | 6.000 | Thickener |
| Sodium C12-C15 Pareth Sulfate [3] | 35.000 | Surfactant |
| Sodium Hydroxide 20% aqueous solution | 1.000 | pH adjuster |
| Cocamidopropyl Betaine[4] | 8.000 | Surfactant |
| Methylchloroisothiazolinone and Methylisothiazolinone[5] | 0.100 | Preservative |
| Citric Acid (40%) | 0.500 | pH adjuster |

[1] EDETA B POWDER; trademark and origin: BASF
[2]CARBOPOL AQUA SF-1 POLYMER; trademark and origin: NOVEON
[3] ZETESOL AO 328 U; trademark and origin: ZSCHIMMER & SCHWARZ
[4]TEGO-BETAIN F 50; trademark and origin: GOLDSCHMIDT
[5]KATHON CG; trademark and origin: ROHM & HASS
Ingredients are mixed, pH is adjusted to 6-6.3 (Viscosity: 4500 cPo +/− 1500 cPo (Brookfield RV/Spindle#4/20 RPM)).

Example 28

Shower-Gel Composition

A sufficient amount of microcapsule slurry A-J is weighed and mixed in the following composition (Table 38) to add the equivalent of a 0.2% perfume.

TABLE 38

| shower gel composition | | |
|---|---|---|
| Ingredients | Amount (% wt) | Function |
| WATER deionized | 52.40 | Solvent |
| Tetrasodium EDTA [1] | 0.10 | Chelating agent |
| Sodium Benzoate | 0.50 | Preservative |
| Propylene Glycol | 2.00 | Solvent |
| Sodium C12-C15 Pareth Sulfate [2] | 35.00 | Surfactant |
| Cocamidopropyl Betaine[3] | 8.00 | Surfactant |
| Polyquaternium-7[4] | 0.20 | Conditioning agent |
| Citric Acid (40%) | 1.00 | pH adjuster |
| Sodium Chloride | 0.80 | Viscosity adjuster |

[1] EDETA B POWDER; trademark and origin: BASF
[2] ZETESOL AO 328 U; trademark and origin: ZSCHIMMER & SCHWARZ
[3]TEGO-BETAIN F 50; trademark and origin: GOLDSCHMIDT
[4]MERQUAT 550; trademark and origin: LUBRIZOL
Ingredients are mixed, pH is adjusted to 4.5 (Viscosity: 3000 cPo +/− 1500 cPo (Brookfield RV/Spindle#4/20 RPM)).

Example 29

Shower-Gel Composition

A sufficient amount of microcapsule slurry A-J is weighed and mixed in the following composition (Table 39) to add the equivalent of 0.2% perfume.

TABLE 39

| shower gel composition | | |
|---|---|---|
| Ingredients | Amount (% wt) | Function |
| WATER deionized | 50.950 | Solvent |
| Tetrasodium EDTA [1] | 0.050 | Chelating agent |
| Sodium Benzoate | 0.500 | Preservative |
| Glycerin 86% | 3.500 | Solvent |
| Sodium Laureth Sulfate [2] | 27.000 | Surfactant |
| Polyquaternium-7[3] | 1.000 | Conditioning Agent |
| Coco-Betaine[4] | 6.000 | Surfactant |
| PEG-120 Methyl Glucose trioleate[5] | 1.000 | Thickener |
| Citric Acid (40%) | 1.000 | pH adjuster |
| Glycol Distearate & Laureth-4 & Cocamidopropyl Betaine[6] | 3.000 | Pearlizing agent |
| Sodium Chloride 20% | 5.000 | Viscosity adjuster |
| PEG-40 Hydrogenated Castor Oil[7] | 1.000 | Viscosity adjuster |

[1] EDETA B POWDER; trademark and origin: BASF
[2] Texapon NSO IS; trademark and origin: COGNIS
[3]MERQUAT 550; trademark and origin: LUBRIZOL
[4]DEHYTON AB-30; trademark and origin: COGNIS
[5]GLUCAMATE LT; trademark and origin: LUBRIZOL
[6]EUPERLAN PK 3000 AM; trademark and origin: COGNIS
[7]CREMOPHOR RH 40; trademark and origin: BASF
Ingredients are mixed, pH is adjusted to 4.5 (Viscosity: 4000 cPo +/− 1500 cPo (Brookfield RV/Spindle#4/20 RPM))

Example 30

Hand Dishwash

A sufficient amount of microcapsule slurry A-J is weighed and mixed in the following composition (Table 40) to add the equivalent of 0.2% perfume.

TABLE 41

Hand dishwash composition

| Ingredients | Amount (% wt) | Function |
|---|---|---|
| Linear alkylbenzene sulfonic acid [1] | 20 | Anionic surfactant |
| Diethanolamide [2] | 3.5 | Foam booster |
| Sodium Hydroxide (50%) [3] | 3.4 | pH Adjuster/neutralizer |
| Secondary alcohol ethoxolate [4] | 2.5 | Non-ionic surfactant |
| Sodium xylene sulfonate | 6.3 | Hydrotrope |
| Water | 64.3 | Solvent |

[1] Biosoft S-118 ®; trademark and origin: Stepan Company
[2] Ninol 40-CO ®; trademark and origin: Stepan Company
[3] Stepanate SXS ®; trademark and origin: Stepan Company
[4] Tergitol 15-S-9 ®; trademark and origin: Dow Chemical Company Water with sodium hydroxide and diethanolamide are mixed. LAS is added. After the LAS is neutralized, the remaining ingredients are added. The pH was Checked (=7-8) and adjusted if necessary.

Example 31

Toothpaste Formulation

A sufficient amount of microcapsule slurry M (corresponding to microcapsules A except that a menthol flavor is encapsulated) is weighed and mixed in the following composition (Table 42) to add the equivalent of 0.2% flavor.

TABLE 42

Toothpaste formulation

| Ingredients | Amount (% wt) |
|---|---|
| Polyethylene glycol 400 | 2.0% |
| Xanthan Gum | 0.6% |
| Sorbitol 70% Solution | 50% |
| Sodium Fluoride | 0.220% |
| Sodium Benzoate | 0.2% |
| Water | 15.230% |
| Hydrated Silica[1] | 22.0% |
| Hydrated Silica[2] | 7.0% |
| Titanium Dioxide CI77891 | 0.5% |
| Sodium Lauryl Sulfate | 1.250% |
| Flavor | 1.2% |
| TOTAL | 100% |

[1] Tixosil 73; trademark and origin:
[2] Tixosil 43; trademark and origin:

Example 32

Dicalcium Phosphate Based Toothpaste Formulation

A sufficient amount of microcapsule slurry M (corresponding to microcapsules A except that a menthol flavor is encapsulated) is weighed and mixed in the following composition (Table 43) to add the equivalent of 0.2% flavor.

TABLE 43

Toothpaste formulation

| Ingredients | Amount (% wt) |
|---|---|
| Sodium carboxymethyl cellulose | 1.2% |
| Flavor | 1.2% |
| DI/Purified Water | Q.S to Final Wt. |

TABLE 43-continued

Toothpaste formulation

| Ingredients | Amount (% wt) |
|---|---|
| Sodium Lauryl Sulfate | 1.3% |
| Glycerine | 20.0% |
| Sodium Saccharin | 0.2% |
| Dicalcium phosphate dihydrate | 36.0% |
| Methylparaben | 0.2% |
| Silica[1] | 3.0% |
| TOTAL | 100% |

[1] Aerosil ®200; trademark and origin:

Example 33

Mouthwash Alcohol Free Formulation

A sufficient amount of microcapsule slurry M (corresponding to microcapsules A except that a menthol flavor is encapsulated) is weighed and mixed in the following composition (Table 44) to add the equivalent of 0.20% flavor.

TABLE 44

Mouthwash formulation

| Ingredients | Amount (% wt) |
|---|---|
| Propylene Glycol | 10% |
| Flavor | 0.240% |
| DI/Purified Water | Q.S to Final Wt. |
| Poloxamer 407 NF | 0.240% |
| Sodium Lauryl Sulfate | 0.040% |
| Sorbitol 70% Solution | 10.0% |
| Sodium Saccharin | 0.030% |
| Glycerine | 3.0% |
| Sodium Benzoate | 0.100% |
| Sucralose | 0.020% |
| Benzoic Acid | 0.050% |
| TOTAL | 100% |

Example 34

Mouthwash Formulation

A sufficient amount of microcapsule slurry M (corresponding to microcapsules A except that a menthol flavor is encapsulated) is weighed and mixed in the following composition (Table 45) to add the equivalent of 0.2% flavor.

TABLE 45

Mouthwash formulation

| Ingredients | Amount (% wt) |
|---|---|
| Ethyl Alcohol 190 Proof | 15.0% |
| Flavor | 0.240% |
| DI/Purified Water | Q.S to Final Wt. |
| Poloxamer 407 NF | 0.240% |
| Sodium Lauryl Sulfate | 0.040% |
| Sorbitol 70% Solution | 10.0% |
| Sodium Saccharin | 0.030% |
| Glycerine | 3.0% |
| Sodium Benzoate | 0.100% |
| Sucralose | 0.020% |
| Benzoic Acid | 0.050% |
| TOTAL | 100% |

The invention claimed is:

1. A process for preparing a polyamide core-shell micro-capsule slurry comprising the following steps:

a) Dissolving at least one acyl chloride in a hydrophobic material to form an oil phase;

b) Dispersing the oil phase obtained in step a) into a water phase comprising a first amino compound to form an oil-in-water emulsion;

c) Performing a curing step to form polyamide microcap-sules in the form of a slurry;

wherein a stabilizer is added in the oil phase and/or in the water phase, wherein at least a second amino-compound is added in the water phase before the formation of the oil-in-water emulsion and/or in the oil-in-water emulsion obtained after step b), wherein the first amino compound is an amino-acid, wherein the polyamide microcapsules comprise a poly-amide shell comprising the at least one acyl chloride, the first amino compound, the second amino com-pound, and the stabilizer, and wherein the stabilizer is a protein.

2. The process according to claim 1, further comprising the following step:

following step b), adding to the oil-in-water emulsion obtained in step b) a second amino compound.

3. The process according to claim 1, wherein the acyl chloride is chosen from the group consisting of benzene-1,3,5-tricarbonyl chloride, benzene-1,2,4-tricarbonyl trichlo-ride, benzene-1,2,4,5-tetracarbonyl tetrachloride, cyclo-hexane-1,3,5-tricarbonyl trichloride, isophthalyol dichloride, diglycolyl dichloride, succinic dichloride, and mixtures thereof.

4. The process according to claim 2, wherein the second amino compound is chosen from the group consisting of cystamine, cystamine hydrochloride, cystine, cystine hydro-chloride, cystine dialkyl ester, cystine dialkyl ester hydro-chloride, a xylylene diamine, 1,2-diaminocyclohexane, 1,4-diaminocyclohexane, L-lysine, L-Lysine ethyl ester, polyetheramines, ethylene diamine, diethylene triamine, spermine, spermidine, polyamidoamine (PAMAM), guani-dine carbonate, chitosan, tris-(2-aminoethyl)amine, 3-ami-nopropyltriethoxysilane, L-arginine and mixtures thereof.

5. The process according to claim 2, wherein the first amino compound and the second amino compound are different.

6. The process according to claim 2, wherein the molar ratio between the functional group NH2 of the second amino compound and the functional group COCl of the acyl chloride is between 0.01 and 7.5.

7. The process according to claim 1, wherein the weight ratio between the acyl chloride and the hydrophobic material is between 0.01 and 0.09.

8. The process according to claim 1, wherein the first amino-compound is chosen from the group consisting of L-Lysine, L-Arginine, L-Histidine, L-Tryptophane, L-Serin, L-Glutamine, L-Threonine and mixtures thereof.

9. The process according to claim 1, wherein the stabilizer chosen from the group consisting of whey protein, casein, sodium caseinate, bovine serum albumin, and mixtures thereof.

\* \* \* \* \*